US011628869B1

(12) United States Patent
Brick et al.

(10) Patent No.: US 11,628,869 B1
(45) Date of Patent: Apr. 18, 2023

(54) AUTOMATED TIE MARKING

(71) Applicant: BNSF Railway Company, Fort Worth, TX (US)

(72) Inventors: Michael James Brick, Fort Worth, TX (US); Lisa Marie Kelly, Weatherford, TX (US); Samuel Minton, Brandon, SD (US); Richard William Keller, Spokane Valley, WA (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 17/687,210

(22) Filed: Mar. 4, 2022

Related U.S. Application Data

(63) Continuation-in-part of application No. 17/687,025, filed on Mar. 4, 2022.

(51) Int. Cl.
*B61L 23/04* (2006.01)
*B61L 3/00* (2006.01)
(Continued)

(52) U.S. Cl.
CPC .............. *B61L 3/008* (2013.01); *B61H 13/34* (2013.01); *B61L 15/009* (2013.01);
(Continued)

(58) Field of Classification Search
CPC ...... B61L 3/008; B61L 15/009; B61L 23/041; B61L 25/06; B61L 27/12; B61H 13/34
See application file for complete search history.

(56) References Cited

U.S. PATENT DOCUMENTS 9,441,956 B2 9/2016 Kainer et al.
9,850,624 B2 12/2017 Schrunk, III
(Continued)

OTHER PUBLICATIONS

Wilson, Bill, Do It Without stopping: FRA's Final Rule will allow track inspection market to take full advantage of technology, Nov. 30, 2020.
(Continued)

*Primary Examiner* — Zachary L Kuhfuss
(74) *Attorney, Agent, or Firm* — Whitaker Chalk Swindle & Schwartz PLLC; Enrique Sanchez, Jr.

(57) ABSTRACT

A system and method for automating railroad maintenance by a tie gang using electronic tie marking (ETM) configured to optimize railroad asset maintenance. The system enables collision avoidance between members of the tie gang performing maintenance on railway assets (e.g., Rails, Ties, Ballasts, Turnouts, Crossings, etc.). The system can generate production numbers for the railway assets and evaluate an asset queue for the tie gang to perform maintenance. The system can utilize real-time updates from the tie gang to optimize work output. The system can provide a customizable user interface to identify, track, and process information related to maintenance of the railroad asset. The system also provides for a heads-up-display (HUD) to notify an operator of relevant information, such as maintenance information, travel indicators, and updated asset queue. The system can identify a next location and calculate an optimum path based on sensor input incorporating machine-specific and environmental characteristics.

18 Claims, 9 Drawing Sheets

(51) Int. Cl.
*B61H 13/34* (2006.01)
*B61L 25/06* (2006.01)
*B61L 15/00* (2006.01)
*B61L 27/12* (2022.01)

(52) U.S. Cl.
CPC ............ *B61L 23/041* (2013.01); *B61L 25/06* (2013.01); *B61L 27/12* (2022.01)

(56) References Cited

U.S. PATENT DOCUMENTS

| | | |
|---|---|---|
| 9,920,487 B2 | 3/2018 | Delucia et al. |
| 10,471,976 B2 | 11/2019 | Mian |
| 10,618,168 B2 | 4/2020 | Gros et al. |
| 2006/0012246 A1* | 1/2006 | Smith .................... B61L 3/127 |
| | | 303/155 |
| 2012/0192756 A1 | 8/2012 | Miller et al. |
| 2015/0268172 A1* | 9/2015 | Naithani ............... B61L 23/048 |
| | | 348/129 |
| 2016/0046308 A1* | 2/2016 | Chung ................. B61L 23/047 |
| | | 701/20 |
| 2017/0227470 A1 | 8/2017 | Cesarano |
| 2018/0281829 A1 | 10/2018 | Euston et al. |
| 2019/0194878 A1 | 6/2019 | Hamilton et al. |
| 2019/0248396 A1* | 8/2019 | Khosla ................. B61L 25/025 |
| 2020/0270819 A1 | 8/2020 | Irion et al. |
| 2021/0171072 A1* | 6/2021 | Hamilton ............... B61L 27/53 |
| 2021/0245747 A1* | 8/2021 | Naithani ............... B60W 30/12 |

OTHER PUBLICATIONS

Trinh et al, Enhanced Rail Component Detection and Consolidation for Rail Track Inspection, Jan. 31, 2012.

* cited by examiner

AUTOMATED TIE MARKING

CROSS-REFERENCE TO RELATED APPLICATIONS

The present application is a Continuation-in-Part of U.S. patent application Ser. No. 17/687,025, filed Mar. 4, 2022, the entirety of which is hereby incorporated by reference for all purposes.

TECHNICAL FIELD

The present disclosure relates generally to the management of railroad asset maintenance, particularly systems and methods for automated railroad asset maintenance disposed throughout a railroad system infrastructure.

BACKGROUND

Railroad assets such as railroad ties, spikes, ballast, and other assets degrade over time. If the railroad assets are subjected to extreme elements, the assets can degrade at a much higher rate. Accordingly, significant resources have been dedicated to inspecting and repairing such railroad infrastructure. Traditional approaches to identifying and repairing/replacing degraded railroad assets suffer from many shortcomings. For example, identifying a railroad spike to replace can be difficult. Generally, the railroad spike can have asset location data, such as the latitude and longitude of the railroad asset. However, the method to arrive at the latitude and longitude provides difficulty in locations without sufficient global positioning system (GPS) signal strength.

Conventional approaches can use a number of methods, including counting railroad ties to identify their location. Such an approach can provide wide variability and inaccuracies. For example, these approaches can be as far off of the target railroad asset by tens of railroad ties. Naturally, being so far off of the target can cause significant efficiency errors in maintaining a railroad. Additionally, railroad personnel are still required to use the improper GPS data and travel to the improper location to perform maintenance on the railroad asset. Inefficient maintenance procedures can lead to near impossible railroad asset maintenance when based on inaccurate location information. And the determination of whether an asset is to receive maintenance can be subjective without any uniformity based on a visual determination of asset integrity.

Additionally, finding the correct railroad asset is another problem. In the rare case that the maintenance crew reaches the correct location, identifying the correct railroad asset prior to repair/replacement requires manual intervention for the maintenance crew to visually inspect the asset to determine if it indeed requires maintenance. Visually inspecting an asset can be confusing to the maintenance crew because the asset might be damaged, dirty, and obfuscated. Moreover, the maintenance crew requires various machines to complete maintenance, each machine working on the railroad asset one at a time. In this manner, a first group of the maintenance crew can reach the railroad asset minutes, or even hours, before a second group of the maintenance crew. By approaching the railroad asset at different times, the difficulty to identify the same railroad asset increases because there might be no efficient way to communicate which railroad asset was worked on by the first group. Although there is an antiquated approach to railroad asset maintenance, it is near impossible to consistently maintain an entire railroad in a comparable manner.

SUMMARY

The present disclosure achieves technical advantages as a system and method for automating railroad maintenance by a tie gang using Electronic Tie Marking (ETM) configured to optimize railroad asset maintenance. The present system enables collision avoidance between members of the tie gang performing maintenance on railway assets (e.g., Rails, Ties, Ballasts, Turnouts, Crossings, etc.). The system can generate production numbers for the railway assets and evaluate an asset queue for the tie gang to perform maintenance. The system can utilize real-time updates from the tie gang to optimize work output. The system can provide a customizable user interface to identify, track, and process information related to maintenance of the railroad asset. The system can also include a heads-up-display (HUD) to notify an operator of relevant information, such as maintenance information, travel indicators, and updated asset queue. The system can identify a next location to perform maintenance and can calculate an optimum path based on sensor input incorporating machine-specific and environmental characteristics.

Accordingly, the present disclosure discloses concepts inextricably tied to computer technology such that the present disclosure provides the technological benefit of optimizing efficiency of a tie gang to perform maintenance on railway assets. The system can provide the tie gang with a system configured to avoid collisions, generate production queues, and adaptably display updated information in real-time. The present disclosure goes beyond mere manual control of the members of the tie gang, incorporating at least an ability to provide collision avoidance to minimize hazardous collisions on the track. The system can generate production numbers for the railway assets to optimize efficiency of the tie gang, avoiding the typical time-study method for the tie gang to perform maintenance. This also provides the benefit of simplifying the maintenance process for the tie gang by providing them with only relevant information needed for a particular railroad asset, so the tie gang can conduct their maintenance more quickly, more clearly, and more concisely, without inefficient duplicative work.

The present disclosure provides a technological solution missing from conventional systems by at least providing a system to avoid collisions between members of a tie gang. In contrast, traditional systems simply rely on manual operator control, which can result in inefficient operator control inundated with errors, a hazardous environment, and add to the strain on an already overspent system. Moreover, the present disclosure provides another technological solution missing from conventional systems by providing a system to generate production numbers for railway assets. Generating the production numbers provides an objective work efficiency approach as compared to the traditional time-study approach. The traditional approach applies a method of calculating an average time spent to perform maintenance on a plurality of railway assets. In this manner, the traditional approach is subjective to the efficiency of the tie gang, rather than based on objective parameters such as an inventory of the railway assets. The system can also provide at least the following functionality:

Collision avoidance system between members of a tie gang;

Machine generated production numbers to optimize the performance of maintenance on railway assets;

HUD to display information to operators of the tie gang, updating in real-time to enable efficient work performance;

Analysis of an image of the railroad asset and automated maintenance procedures of the railroad asset; and Pinpoint location determination, exactly where the railroad asset is that needs to be replaced or maintenance.

By way of overview, the process flow can begin at the machine production identifier, which can be displayed on a user interface (UI) operable by a crew member in the tie gang performing maintenance on a section of track or another railroad asset. Using track maintenance as an example, the tie gang can generate trackside inspections with or without connectivity using a local file distribution system. The precise location (e.g., latitude and longitude coordinates) of a user/client can be determined using real-time kinematic (RTK)-corrected GPS data from a GPS disposed within the tie gang, comparing the location information for the railroad asset with visual techniques to determine a precise location, or comparing the location information of the railroad asset with a combination of RTK-corrected GPS data, visual techniques, and radar signal processing. The system can transmit the production identifiers to the machines of the tie gang for ease of railroad asset identification. In current applications, the maintenance of railroad assets is based on a time to complete the maintenance, rather than organized using a workflow production system and production identifiers. For example, some tie gangs can complete railroad maintenance in half the time as another tie gang, which leads to inconsistencies in maintenance management. The use of production identifiers can free up the systemic inefficiency of railroad maintenance.

The system also can display information about the production identifier using the UI. The UI can include direction, location, railroad asset information, among other characteristics important to the tie gang. The UI can include a map having the railroad line segment milepost to the client to generate a workflow schedule. The location data can be captured at the trackside, along with the asset data for the track type (e.g., mainline, main one, main two, main three, turnout, switch, bridge, crossover, etc.), as well as any defect data. In one exemplary embodiment, users can store maintenance instructions for one or more sections of track on a client locally without connectivity, and once connectivity is acquired, all the stored inspections can be uploaded to a central server and further processed by the backend system.

The system also can determine a movement path of the tie gang. The movement path can be based on various factors impacting an ability of the tie gang to travel along the tracks of the railroad. For example, the various factors can include both vehicle characteristics and external environmental characteristics. Particularly, the movement of the tie gang can be heavily reliant on the weight of the machines, the length of the machines, and environmental conditions. For example, the weight of the machines in the tie gang might increase if collecting discarded railroad assets or decrease if depositing new railroad assets. Additionally, the system can optimize a movement path of the tie gang based on a braking algorithm to determine the appropriate braking maneuvers to apply to reach a next railroad asset to perform maintenance.

The system also can perform collision avoidance for the machines in the tie gang. The tie gang can include a plurality of machines and the track can include curves that block the line of sight for the engineers in the tie gang. Accordingly, the poor visual ability of the machines of the tie gang can result in hazardous conditions. The system can determine when an obstacle is ahead of the machines of the tie gang and can apply brakes of the machines in the tie gang accordingly. For example, when the obstacle is another machine, the machines of the tie gang can include forward-looking radar systems to identify whether the obstacle machine is ahead of the respective machine in the tie gang. Alternatively, the machines of the tie gang can perform machine-to-machine (M2M) communications to establish distances between the machines for enhanced safety.

It is an object of the invention to provide a system for collision avoidance between locomotives of a tie gang performing maintenance on a railway. It is a further object of the invention to provide a method for collision avoidance between members of a tie gang to perform maintenance on a railway. It is a further object of the invention to provide a system for master production scheduling using machine generated production numbers. It is a further object of the invention to provide a system for a HUD indicating railway transportation directions and railway assets to perform maintenance. These and other objects are provided by at least the following embodiments.

In one embodiment, a system for collision avoidance between locomotives of a tie gang performing maintenance on a railway, comprising: a real-time sensor array for detecting objects using a plurality of acquired sensor inputs, including real-time images; a memory for storing the acquired sensor inputs and location data relating to the acquired sensor inputs, and a recognition model representing contour information of a surrounding environment of a locomotive of the tie gang; and a processor that is configured to identify the contour information of the surrounding environment and detect whether an object is proximate to the locomotive by performing the steps of: identifying whether the object is proximate to the locomotive based on a response received by the real-time sensor array; calculating a distance to the object based on the response received by the real-time sensor array; when the distance between the object and the locomotive is less than a safety procedural threshold distance, generating an alert for an operator of the locomotive; transmitting a communication signal to the object to determine whether the object is an additional locomotive of the tie gang; and applying brakes of the locomotive to avoid an impending collision. Wherein the processor is further configured to perform the steps of determining whether the object is platooning in an aggregation of at least two locomotives of the tie gang electronically coupled to perform maintenance on the railway. Wherein the processor is further configured to perform the steps of comparing the distance between the object and the locomotive with the safety procedural threshold distance to calculate whether the object is within the safety procedural threshold distance. Wherein the processor is further configured to perform the steps of identifying a path ahead of the locomotive to detect whether the path ahead includes a curve or a blocked field of view. Wherein the processor is further configured to perform the steps of altering transmission time of the real-time sensor array to compensate for the curve or the blocked field. Wherein the processor, when the object is the additional locomotive of the tie gang, is further configured to perform the steps of instructing the object to increase or decrease a speed of the object. Wherein the processor is further configured to perform the steps of adapting a force applied to the brakes based on environmental conditions of the locomotive. Wherein the processor, when the object is not the additional locomotive of the tie gang, is further configured to perform the steps of generating a critical alert to the operator. Wherein the processor is further configured to perform the steps of adapting a force applied to the brakes based on a variable weight of the locomotive, wherein the variable weight includes increasing or decreasing total weight of the locomotive In another embodiment, a method for collision avoidance between members of a tie gang to perform maintenance on a railway, comprising: identifying whether the object is proximate to the machine based on a response received by the sensors; calculating a distance to the object based on the response received by the sensors; when the distance between the object and the machine is less than the distance from the safety procedure, generating an alert for the operator; determining a path ahead of the machine to detect whether the path ahead requires modified maneuvers; transmitting a communication signal to the object to determine whether the object is a member of the tie gang; and applying the brakes to avoid a collision when the vehicle is detected or the path includes the curve. Wherein the method further comprises determining whether the object is platooning in an aggregation of at least two locomotives of the tie gang electronically coupled to perform maintenance on the railway. Wherein the method further comprises comparing the distance between the object and the locomotive with the safety procedural threshold distance to calculate whether the object is within the safety procedural threshold distance. Wherein the method further comprises determining a path ahead of the locomotive to detect whether the path ahead includes a curve or a blocked field of view. Wherein the method further comprises altering transmission time of the real-time sensor array to compensate for the curve or the blocked field. Wherein the method, when the object is the additional locomotive of the tie gang, further comprises instructing the object to increase or decrease a speed of the object. Wherein the method further comprises adapting a force applied to the brakes based on environmental conditions of the locomotive. Wherein the method, when the object is not the additional locomotive of the tie gang, further comprises generating a critical alert to the operator. Wherein the method further comprises adapting a force applied to the brakes based on a variable weight of the locomotive, wherein the variable weight includes increasing or decreasing total weight of the locomotive.

In another embodiment, a system for master production scheduling using machine generated production numbers, comprising: a memory for storing a queue of railway assets to receive maintenance based on completed work product information regarding the railway assets and a geographic region; a processor configured to generate work production numbers for the queue of railway assets and manage a production output for a tie gang proximate to the geographic region by performing the steps of: identify the railway assets to maintain in the geographic region; generate the queue of railway assets to maintain within the geographic region; identify the tie gang proximate to the geographic region based on the tie gang work schedule or a location determination of the tie gang; generate production numbers for each railway asset in the queue of railway assets; schedule the tie gang to perform maintenance on the railway assets by transmitting the production numbers to the tie gang; receive updates from the tie gang as the tie gang performs the maintenance on the railway assets; and update the queue of railway assets in real-time to organize remaining railway assets to receive maintenance; and a cloud environment for organizing workflow production and updating the queue of railway assets in real-time items to receive maintenance. Wherein the processor is further configured to perform the steps of determining whether the railway asset already exist in the queue of railway assets. Wherein the processor is further configured to perform the steps of comparing the efficiency of the tie gang with the queue of railway assets in the geographic region.

In another embodiment, a system for a HUD indicating railway transportation directions and railway assets to perform maintenance, comprising: a real-time sensor array for identifying a location using a plurality of acquired sensor inputs, including real-time images; a memory for storing the acquired sensor inputs and location data relating to the acquired sensor inputs, and a recognition model representing contour information of a surrounding environment of a locomotive; and a processor that is configured to identify the surrounding environment and update a display of the locomotive according to the location of the locomotive by performing the steps of: projecting railway information onto the display; collecting the acquired sensor inputs; displaying transportation information from a maintenance file based on the location of the locomotive; receiving the maintenance information from the maintenance file to display workhead information onto the display of the locomotive; and displaying an updated icon based on a completion of maintenance according to the maintenance information and an updated location of the locomotive. Wherein the sensor inputs include a high-resolution radar. Wherein the processor is further configured to perform the steps of comparing the acquired sensor inputs with location information to identify a location of the locomotive. Wherein the processor is further configured to perform the steps of identifying whether to update a local maintenance file in response to completed maintenance on railway assets. Wherein the processor is further configured to perform the steps of updating the local maintenance file based on the completed maintenance on the railway assets. Wherein the maintenance information indicates whether the railway assets are to receive maintenance. Wherein the railway component includes at least one of a tie, ballast, a spike, or a rail. Wherein the updated icon is based on a type of maintenance to be performed corresponding to the railway asset. Wherein the updated icon is at least one of various colored text or shapes.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The disclosure presented in the following written description and the various features and advantageous details thereof, are explained more fully with reference to the non-limiting examples included in the accompanying drawings and as detailed in the description, which follow. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can visualize or recognize the members of the genus. Accordingly, these examples should not be construed as limiting the scope of the claims.

Figure 1:
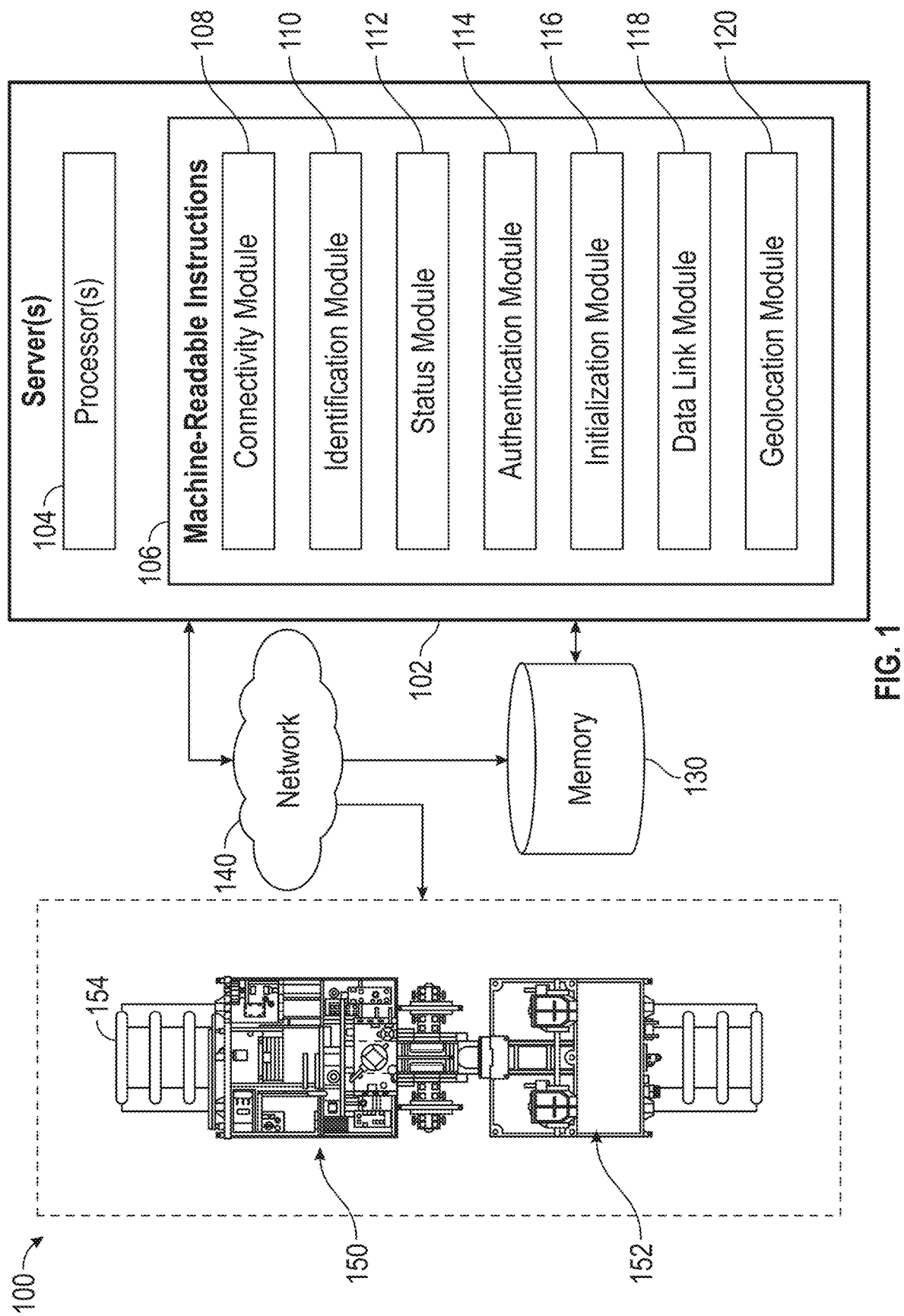
FIG. 1 illustrates a railroad asset maintenance system schematic, in accordance with one or more exemplary embodiments of the present disclosure.

FIG. 1 illustrates a schematic view of a railroad asset maintenance system 100, in accordance with one or more exemplary embodiments of the present disclosure. The system 100 can include one or more servers 102 having one or more processor(s) 104, a memory 130, machine-readable instructions 106, including a connectivity module 108, identification module 110, status module 112, authentication module 114, initialization module 116, data link module 118, and geolocation module 120, among other relevant modules. The server 102 can be operably coupled to one or more clients via a network 140. The client can be a machine 150 including a railroad maintenance assembly 152 as part of a tie gang along a railway 154. In another exemplary embodiment, the machine 150 can include an application configured to communicate with the server 102 over the network 140.

The aforementioned system components (e.g., server(s) 102 and machine 150) can be communicably coupled to each other via the network 140, such that data can be transmitted. The network 140 can be the Internet, intranet, or other suitable network. The data transmission can be encrypted, unencrypted, over a VPN tunnel, or other suitable communication means. The network 140 can be a WAN, LAN, PAN, or other suitable network type. The network communication between the clients, server 102, or any other system component can be encrypted using PGP, Blowfish, Twofish, AES, 3DES, HTTPS, or other suitable encryption. The system 100 can be configured to provide communication via the various systems, components, and modules disclosed herein via an application programming interface (API), PCI, PCI-Express, ANSI-X12, Ethernet, Wi-Fi, Bluetooth, or other suitable communication protocol or medium. Additionally, third party systems and databases can be operably coupled to the system components via the network 140.

The data transmitted to and from the components of system 100 (e.g., the server 102 and machine 150), can include any format, including JavaScript Object Notation (JSON), TCP/IP, XML, HTML, ASCII, SMS, CSV, representational state transfer (REST), or other suitable format. The data transmission can include a message, flag, header, header properties, metadata, and/or a body, or be encapsulated and packetized by any suitable format having same.

The server(s) 102 can be implemented in hardware, software, or a suitable combination of hardware and software therefor, and may comprise one or more software systems operating on one or more servers, having one or more processor(s) 104, with access to memory 130. Server(s) 102 can include electronic storage, one or more processors, and/or other components. Server(s) 102 can include communication lines, connections, and/or ports to enable the exchange of information via a network (e.g., the network 140) and/or other computing platforms. Server(s) 102 can also include a plurality of hardware, software, and/or firmware components operating together to provide the functionality attributed herein to server(s) 102. For example, server(s) 102 can be implemented by a cloud of computing platforms operating together as server(s) 102, including Software-as-a-Service (SaaS) and Platform-as-a-Service (PaaS) functionality. Additionally, the server(s) 102 can include memory 130.

Memory 130 can comprise electronic storage that can include non-transitory storage media that electronically stores information. The electronic storage media of electronic storage can include one or both of system storage that can be provided integrally (e.g., substantially non-removable) with server(s) 102 and/or removable storage that can be removably connectable to server(s) 102 via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions 106, software algorithms, control logic, data generated by processor(s), data received from server(s), data received from computing platform(s), and/or other data that can enable server(s) to function as described herein. The electronic storage can also include third-party databases accessible via the network 140.

Processor(s) 104 can be configured to provide data processing capabilities in server(s) 102. As such, processor(s) 104 can include one or more of a digital processor, an analog processor, a digital circuit designed to process information, an analog circuit designed to process information, a state machine, and/or other mechanisms for electronically processing information, such as FPGAs or ASICs. The processor(s) 104 can be a single entity or include a plurality of processing units. These processing units can be physically located within the same device, or processor(s) 104 can represent processing functionality of a plurality of devices or software functionality operating alone, or in concert.

The processor(s) 104 can be configured to execute machine-readable instructions 106 or machine learning modules via software, hardware, firmware, some combination of software, hardware, and/or firmware, and/or other mechanisms for configuring processing capabilities on processor(s) 104. As used herein, the term "machine-readable instructions" can refer to any component or set of components that perform the functionality attributed to the machine-readable instructions component 106. This can include one or more physical processor(s) 104 during execution of processor-readable instructions, the processor-readable instructions, circuitry, hardware, storage media, or any other components.

The server(s) 102 can be configured with machine-readable instructions having one or more functional modules. The machine-readable instructions 106 can be implemented on one or more servers 102, having one or more processor(s) 104, with access to memory 130. The machine-readable instructions 106 can be a single networked node, or a machine cluster, which can include a distributed architecture of a plurality of networked nodes. The machine-readable instructions 106 can include control logic for implementing various functionality, as described in more detail below. The machine-readable instructions 106 can include certain functionality associated with the system 100. Additionally, the machine-readable instructions 106 can include a smart contract or multi-signature contract that can process, read, and write data to the database, distributed ledger, or blockchain.

The maintenance assembly 152 can include various maintenance assemblies to perform maintenance. For example, the maintenance assembly 152 can include assemblies such as a computer, GPS, control and display units, workhead assemblies, among other relevant assemblies for performing maintenance.

Figure 2:
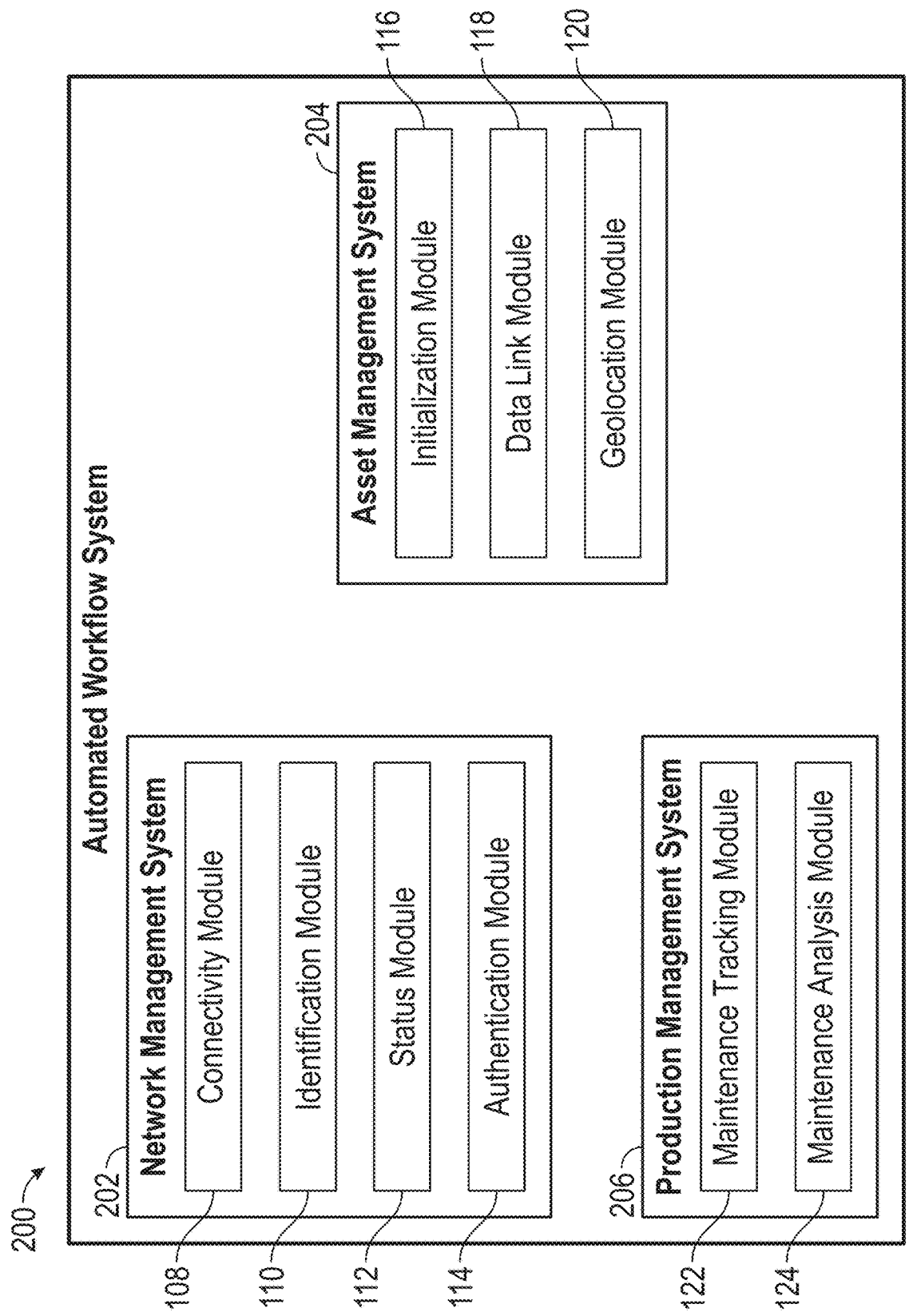
FIG. 2 illustrates a block diagram of an automated workflow system, in accordance with one or more exemplary embodiments of the present disclosure.

FIG. 2 illustrates a schematic view of an automated workflow system 200, in accordance with one or more exemplary embodiments of the present disclosure. The system 200 can include a network management system 202, an asset management system 204, and a production management system 206. Although certain exemplary embodiments may be directed to rail assets, the system 200 can be used to plan maintenance for a type of railroad asset, including rails, ballasts, panels, ties, turnouts, facilities, or any suitable asset.

In one exemplary embodiment, the network management system 202 can include a connectivity module 108, identification module 110, status module 112, and authentication module 114. The connectivity module 108, identification module 110, status module 112, and authentication module 114 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The network management system 202 can be configured to send and receive messages related to an inspection or other suitable activity, to and from the client or server. In another exemplary embodiment, the network management system 202 can generate one or more elements for display on the user device. The elements can provide additional information to the user related to an inspection. For example, alerts can be generated by the network management system 202 and displayed on the client to indicate inspection count, inspection completion, inspection submission, inspection request, or other suitable information. Additionally, system symbols can be displayed on the client to indicate inspection status.

The connectivity module 108 can establish a network connection between the vehicle and the one or more servers 102. For example, the connectivity module 108 can execute either hardware or software to wirelessly, or in a wired manner, connect to the network 140. The connectivity module 108 compares a strength of a network connectivity of the server 102 with a known value to determine the network is accessible. In an example, the connectivity module 108 can ping a known address of the vehicle to determine whether the vehicle is accessible. For example, the connectivity module 108 can store the Internet Protocol (IP) addresses of a plurality of vehicles to perform maintenance and transmit electrical signals through the network 140 to the IP addresses. If the vehicle is accessible based on a response from one or more of the vehicles (e.g., based on responses from the particular IP addresses), the connectivity module 108 can execute the identification module to further determine whether the vehicle is an identified vehicle for performing maintenance on the railway.

The identification module 110 can identify whether the responses from the vehicles correspond with an identified vehicle for performing maintenance on the railway. For example, the identification module 110 can correlate information from the connectivity module 108 with a workflow queue including a schedule of all the maintenance to be performed on the particular railway. The identification module 110 can compare the information from the responses with the workflow queue to verify the vehicle is the identified vehicle to perform the maintenance.

The status module 112 can list data stored on the server 102 for a particular user. In another example, the status module 112 can indicate the status of one or entries stored on the client or server for a particular user. For example, an inspection stored on the server 102 can be displayed on a client and labeled with its status (e.g., "in progress," "completed," or "to be completed") on a dashboard page of the client. In another example, the status module 112 can display a notification on the client of a status change or a new requirement (e.g., new or re-inspection, capital plan generation, approval request, change request, etc.).

The authentication module 114 authenticate a user on a client, such as a mobile phone, laptop, tablet, wearable device, or other suitable device. For example, the authentication module 114 can authenticate a user or the vehicle using a username, password, authentication token, biometric, or other suitable attribute received from the vehicle or user. In an example embodiment, the authentication module 114 can generate an authentication token for a particular user, session, or request. In another example, the authentication module 114 can generate an authentication token using user data stored in the client. For example, a user can access a client by providing valid credentials via a login page or screen, including a username and password, biometrics, multi-factor authentication, or other suitable credential, such credentials, along with a user's information such as name, username, employee number, etc, can be stored in the client or server. In another example, the authentication module 114 can process at least a portion of the credentials and/or user information to generate an authentication token. For example, the authentication token can be generated as a JSON Web Token (JWT), via dongles or key fobs that can periodically generate a new authentication token in accordance with a known algorithm, using an authenticator app on the client or sent on demand via SMS, by hashing at least a portion of the login credentials, or other suitable methodology. In an example, the authentication token can allow for single sign-on authentication to the server and/or memory from the client.

In one exemplary embodiment, the asset management system 204 can include an initialization module 116, data link module 118, and a geolocation module 120. The initialization module 116, data link module 118, and a geolocation module 120 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The asset management system 204 can be configured to send and receive messages related to an inspection or other suitable activity, to and from the client or server. In another exemplary embodiment, the asset management system 204 can generate one or more elements for display on the user device. The elements can provide additional information to the user related to an inspection. For example, alerts can be generated by the asset management system 204 and displayed on the client to indicate inspection count, inspection completion, inspection submission, inspection request, or other suitable information. Additionally, system symbols can be displayed on the client to indicate inspection status.

In one embodiment, the initialization module 116 can initiate an action. For example, the actions can include asset type selection, create inspection, download plans, search inspections, change settings, or other suitable action. In an example, the initialization module 116 can upload inspections to or download inspections from the server. In an example, the initialization module 116 can initiate an action by calling or instantiating one or more modules on the server, WebUI, or client. In another example, one or more inspections may be transferred to or received from the client via the initialization module 116 over an encrypted network (e.g., the network 140).

In one exemplary embodiment, data link module 118 can establish a data link to the vehicle. For example, the data link module 118 can establish the data link using a virtual environment over the network. In another example, the data link module 118 can establish the data link using satellite communications when the vehicle is in remote locations. In an example, the data link module 118 can include a custom protocol arrangement for optimum communication between the vehicle and the server. In an example, the data link module 118 can establish data links with a plurality of vehicles to transmit data to all available vehicles performing maintenance.

The data link module 118 can identify whether the data link is established based on a value of a signal threshold. For example, the signal threshold can correspond to wireless communication signal strength and be reliant on the vehicle location. When the vehicle is in a remote area of geography, without any cellular reception, or any satellite availability, the signal threshold can be at a minimum. Alternatively, when the vehicle is within an area able to reach cellular signal or satellite availability, the signal threshold can be at a maximum.

In one exemplary embodiment, the geolocation module 120 can transmit and receive location coordinates of the vehicle. For example, the geolocation module 120 can locate the vehicle based on radio frequency triangulation, trilateration, electromagnetic sensor detection, or from latitude and longitude values, or another suitable geolocation method. In another example, the geolocation module 120 can locate a plurality of vehicles performing maintenance on a railway. For example, the geolocation module 120 can locate the vehicle based on real-time imaging. In an example, the vehicle can transmit the real-time images and the geolocation module 120 can process the images to compare the images to a known location to identify the location of the vehicle.

For example, during railway maintenance, a user can begin inspecting a rail segment by beginning at a start point on a first end of the rail segment and capture a series of data points related to the segment. In order to begin logging the data related to an inspection, the user's location must first be determined. In one exemplary embodiment, the user's location can be identified by receiving one or more characteristics of the user's location (e.g., line segment, milepost location, etc.) or by utilizing the GPS functionality of the client. In another exemplary embodiment, once the GPS location (latitude and longitude coordinates) are determined, the geolocation module 120 can determine one or more characteristics of the user's location (e.g., line segment, milepost location, curve—high rail or low rail, etc.). In another exemplary embodiment, the GPS coordinates can determine the line segment and the mileposts by correlating the GPS coordinates with those stored in a geographic information system (GIS) database. For example, a GIS database can include one or more rail segment characteristics associated with a particular latitude and longitude coordinate.

In one exemplary embodiment, the production management system 206 can include a maintenance tracking module 122 and maintenance analysis module 124. The maintenance tracking module 122 and maintenance analysis module 124 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The network management system 202 can be configured to send and receive messages related to an inspection or other suitable activity, to and from the client or server. In another exemplary embodiment, the network management system 202 can generate one or more elements for display on the user device. The elements can provide additional information to the user related to an inspection. For example, alerts can be generated by the network management system 202 and displayed on the client to indicate inspection count, inspection completion, inspection submission, inspection request, or other suitable information. Additionally, system symbols can be displayed on the client to indicate inspection status.

The maintenance tracking module 122 can monitor the workflow queue for the maintenance of the railway. For example, the maintenance tracking module 122 can push or pop elements of the workflow queue to either add maintenance requirements or remove maintenance requirements. For example, as the tie gang moves across the railway, the maintenance tracking module 122 can remove the maintenance requirements the tie gang performed. In another example, the maintenance tracking module 122 can assign identifiers to each element of the workflow queue. For example, each of the elements of the workflow queue can include unique tasks directing the tie gang to perform particular tasks to resolve the maintenance for the railway. The maintenance tracking module 122 can generate unique identifiers for each of the tasks to optimize the maintenance process for the tie gang.

The maintenance analysis module 124 can inspect the tie gang efficiency for performing maintenance on the railway. For example, the maintenance analysis module 124 can compare the efficiency to a known value to determine whether the tie gang is performing within a suitable time frame. In another example, the maintenance analysis module 124 can compare the efficiency with an organizational average to determine whether the tie gang is efficient.

Figure 3:
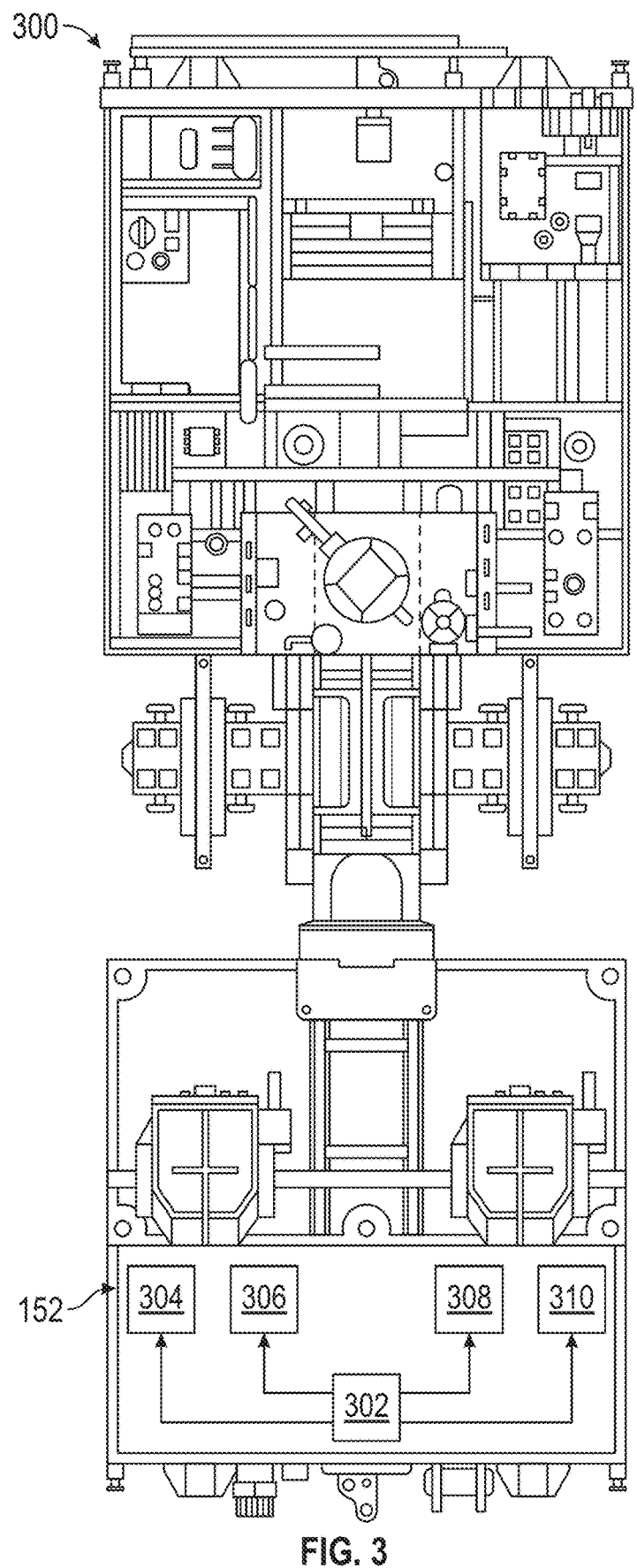
FIG. 3 illustrates a block diagram of a machine in a tie gang, in accordance with one or more exemplary embodiments of the present disclosure.

FIG. 3 illustrates block diagram of a machine in a tie gang 300, in accordance with one or more exemplary embodiments of the present disclosure. In one embodiment, the machine 300 can be the same as the machine 150 in FIG. 1. The machine 300 can include the maintenance assembly 152, which includes a computer 302, positioning assembly 304, a main control and display assembly 306, a workhead assembly 308, and image capture and analysis assembly 310. The aforementioned components are operably coupled to transfer information.

The computer 302 can process instructions and processes to the individual components of the machine 300. For example, the computer 302 can instruct the positioning assembly 304, a main control and display assembly 306, a workhead assembly 308, and image capture and analysis assembly 310 to execute the respective programs. In another example, the programs being executed can include software executable instructions, firmware that controls hardware, or any combination thereof. In another example, the computer 302 can receive a maintenance operation request for a maintenance item. For example, the computer 302 can receive files including the maintenance operation via Universal Serial Bus (USB). The computer 302 can locate files associated with a maintenance operation request based on an identifier for the files.

In another example, the computer 302 can receive data for the maintenance operation and organize the data in response to known fields. For example, the computer 302 can organize the data based on maintenance item type, maintenance operation request type, a type of vehicle, or another type of identifier to organize the data. In another example, the computer 302 can append data to existing data sets to add a new maintenance operation while the machine 300 is in the field. In another example, the computer 302 can remove data from the existing data to remove an old maintenance operation.

The positioning assembly 304 can execute instructions to receive location signals and identify a location of the machine 300. For example, the positioning assembly 304 can receive electromagnetic signal from a GPS satellite including latitude and longitude data for the positioning assembly 304 to identify the location of the machine 300. In another example, the positioning assembly 304 can verify a calibration location. For example, the positioning assembly 304 can verify the calibration location based on a comparison between values of the location information with GPS data. The values of the location information can include latitude and longitude values associated with a location of the vehicle. In another example, the positioning assembly 304 can verify the calibration location using RTK-corrected GPS data, radar signal processing, and/or a real-time image. In an example, the positioning assembly 304 can compare the values of the location information with the GPS data including calculating a difference between the values with the GPS data. The difference can indicate whether the vehicle is located at the calibration location and whether the vehicle is calibrated.

In another example, the positioning assembly 304 can identify the location of the machine 300 using localized means for location detection. For example, the machine 300 can identify the location of the machine 300 based on radar positioning. In an example, the machine 300 can transmit radio frequency energy and receive a response signal. From the response signal, the first locomotive can identify a location. Alternatively, the positioning assembly 304 can identify the location using real-time imaging. For example, the machine 300 can identify the location based on matching a physical location from the real-time images.

In another example, the positioning assembly 304 can transmit and receive electromagnetic energy. For example, the first locomotive can include a radar to transmit and receive the electromagnetic energy. The radar can receive a response from the electromagnetic energy reflecting off the local environment. From the response, the machine 300 can generate an image of the surrounding environment of the machine 300. In another example, the positioning assembly 304 can calculate a travel distance from the calibration location to a maintenance location based on the maintenance information. In another example, the positioning assembly 304 can verify a calibration location of a machine based on the maintenance information and the location information The main control and display assembly 306 can execute instructions to move the machine 300. For example, the main control and display assembly 306 can execute instructions to transfer power to an electromechanical locomotive assembly resulting in the machine 300 to move. The main control and display assembly 306 can operate workheads of the machine 300. For example, the main control and display assembly 306 can execute any of the modules in the main control system 420 and/or the workhead system 436. In an example, the main control and display assembly 306 can activate the spike puller module 438 to perform maintenance on the railway. For example, the main control and display assembly 306 can control the workhead modules manually or automatically. For example, the main control and display assembly 306 can be used by an operator to control one of the workhead modules to perform the maintenance on the railway. Alternatively, the main control and display assembly 306 can automatically control the workhead modules to operate.

In another example, the main control and display assembly 306 can display information regarding the operations for maintenance. For example, the display can include a mobile phone, laptop, tablet, virtual reality system, augmented reality system, heads up display, or another type of display. In an example, the main control and display assembly 306 can show icons that correspond to the various operations and maintenance the machine 300 can perform. For example, the main control and display assembly 306 can illuminate the display as part of a windshield of the machine 300 in an augmented reality manner.

In another example, the main control and display assembly 306 can position a machine 300 having a GPS receiver identifying the machine 300 location at the calibration location by correlating the machine 300 location with the calibration location. In another example, the main control and display assembly 306 can travel the travel distance from the calibration location to the maintenance location to perform the maintenance operation for a maintenance item at the maintenance location. In another example, the main control and display assembly 306 can travel to the calibration location to calibrate the machine.

In another example, the main control and display assembly 306 can control movement of the machine 300. For example, the main control and display assembly 306 can cause the machine 300 to accelerate, decelerate, or stop completely. In another example, the main control and display assembly 306 can be controlled manually or automatically. For example, an operator can control the main control and display assembly 306 to move the machine 300. Alternatively, the main control and display assembly 306 can be controlled automatically based on various sensor inputs.

The workhead assembly 308 can execute instructions to perform any of the workhead modules in the workhead system 436. Just as one example, the workhead assembly 308 can execute a spike puller associated to the spike puller module 438.

The image capture and analysis assembly 310 can execute instructions to execute an image capture module. For example, the image capture and analysis assembly 310 can capture an image of the maintenance item. In an example, the image capture and analysis assembly 310 can control a camera of the machine 300. The image can include an environment of the machine 300. Alternatively, the image can include the maintenance item.

In another example, the image capture and analysis assembly 310 can generate an analysis of the maintenance item based on the image. For example, the analysis is based on image analysis techniques. In an example, wherein the image analysis techniques can include a machine learning model. In another example, the image capture and analysis assembly 310 can transmit the image to a central server to generate the analysis. For example, the central server includes a server on a machine in a tie gang. In another example, the central server includes a server in a cloud-based environment.

In another example, the image capture and analysis assembly 310 can identify the location of the machine 300 based on the image of the environment. The image capture and analysis assembly 310 can correlate the image of the environment with the location information to match the image of the environment to the location of the machine 300

Figure 4:
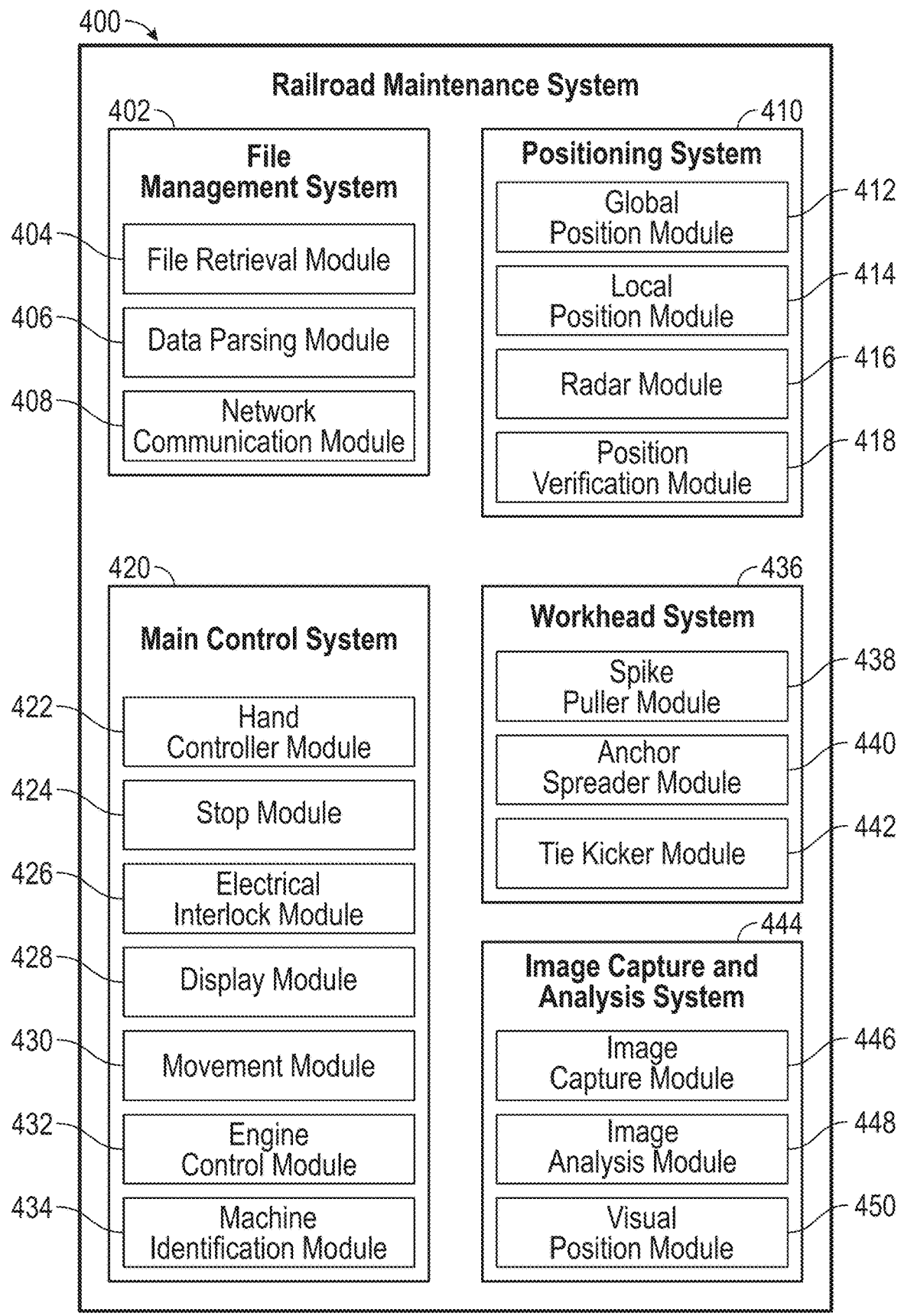
FIG. 4 illustrates a block diagram of a railroad maintenance system, in accordance with one or more exemplary embodiments of the present disclosure.

FIG. 4 illustrates a schematic view of a railroad maintenance system 400, in accordance with one or more exemplary embodiments of the present disclosure. The system 400 can include a file management system 402, positioning system 410, main control system 420, workhead system 436, and image capture and analysis system 444. Although certain exemplary embodiments may be directed to rail assets, the system 400 can be used to plan maintenance for a type of railroad asset, including rails, ballasts, panels, ties, turnouts, facilities, or any suitable asset. In another example, the railroad maintenance system 400 can be executed by any or all of the components of the machine 300 of FIG. 3.

In one exemplary embodiment, the file management system 402 can include a file retrieval module 404, data parsing module 406, and network communication module 408. The file retrieval module 404, data parsing module 406, and network communication module 408 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The file management system 402 can be configured to send and receive messages related to an inspection or other suitable activity, to and from the client or server. In another exemplary embodiment, the file management system 402 can generate one or more elements for display on the user device. The elements can provide additional information to the user related to an inspection. For example, alerts can be generated by the file management system 402 and displayed on the client to indicate inspection count, inspection completion, inspection submission, inspection request, or other suitable information. Additionally, system symbols can be displayed on the client to indicate inspection status.

The file retrieval module 404 can receive a maintenance operation request for a maintenance item. For example, the file retrieval module 404 can receive files including the maintenance operation via Universal Serial Bus (USB). In an example, the maintenance operation request can include a calibration location, a predetermined maintenance information, and location information for a maintenance operation. For example, the calibration location can identify to the first vehicle a location for the first vehicle to calibrate geolocation sensors. In another example, the predetermined maintenance information can include information about what type of maintenance will occur. For example, the predetermined maintenance information can correspond to performing maintenance on a particular railway tie. In an example, the location information for the maintenance operation can identify to the first vehicle a location of where the maintenance operation can occur. The file retrieval module 404 can locate files associated with a maintenance operation request based on an identifier for the files.

The data parsing module 406 can receive data for the maintenance operation and organize the data in response to known fields. For example, the data parsing module 406 can organize the data based on maintenance item type, maintenance operation request type, a type of vehicle, or another type of identifier to organize the data. In another example, the data parsing module 406 can append data to existing data sets to add a new maintenance operation while the first vehicle is in the field. In another example, the data parsing module 406 can remove data from the existing data to remove an old maintenance operation.

The network communication module 408 can establish a network connection between the first vehicle and one or more servers. For example, the network communication module 408 can execute either hardware or software to wirelessly, or in a wired manner, connect to the network 140. The network communication module 408 compares a strength of a network connectivity of the server with a known value to determine the network is accessible. In an example, the network communication module 408 can ping a known address of the vehicle to determine whether the vehicle is accessible. For example, the network communication module 408 can store the IP addresses of a plurality of vehicles to perform maintenance and transmit electrical signals through a network to the IP addresses. If the network is accessible based on a response from (e.g., based on responses from the particular IP addresses), the network communication module 408 can execute the identification module to further determine whether the vehicle is an identified vehicle for performing maintenance on the railway.

In one exemplary embodiment, the positioning system 410 can include a global position module 412, local position module 414, radar module 416, and a position verification module 418. The global position module 412, local position module 414, radar module 416, and position verification module 418 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The positioning system 410 can be configured to send and receive messages related to an inspection or other suitable activity, to and from the client or server. In another exemplary embodiment, the positioning system 410 can generate one or more elements for display on the user device. The elements can provide additional information to the user related to an inspection. For example, alerts can be generated by the positioning system 410 and displayed on the client to indicate inspection count, inspection completion, inspection submission, inspection request, or other suitable information. Additionally, system symbols can be displayed on the client to indicate inspection status.

The global position module 412 can verify the calibration location. For example, the global position module 412 can verify the calibration location based on a comparison between values of the location information with GPS data. The values of the location information can include latitude and longitude values associated with a location of the vehicle. In another example, the global position module 412 can verify the calibration location using RTK-corrected GPS data, radar signal processing, and/or a real-time image. In an example, the global position module 412 can compare the values of the location information with the GPS data including calculating a difference between the values with the GPS data. The difference can indicate whether the vehicle is located at the calibration location and whether the vehicle is calibrated.

The local position module 414 can identify the location of the first vehicle using localized means for location detection. For example, the first vehicle can identify the location of the first vehicle based on radar positioning. In an example, the first vehicle can transmit radio frequency energy and receive a response signal. From the response signal, the first locomotive can identify a location. Alternatively, the local position module 414 can identify the location using real-time imaging. For example, the first vehicle can identify the location based on matching a physical location from the real-time images. In another embodiment, the local position module can be operably coupled to a real-time sensor array to detect objects and identify the location of a first vehicle (or other vehicle) relative to an object or second vehicle. Alternatively, the real-time sensor array can be operably coupled to any module of the railroad maintenance system 400.

The radar module 416 can transmit and receive electromagnetic energy. For example, the first locomotive can include a radar to transmit and receive the electromagnetic energy. The radar can receive a response from the electromagnetic energy reflecting off the local environment. From the response, the first vehicle can generate an image of the surrounding.

The radar module 416 can correspond with an energy threshold to avoid any received spurious signals. For example, the radar module 416 can receive electromagnetic energy from various sources, such as reflections of the transmitted signals off structures in the surrounding environment of the vehicle. For example, the energy threshold can be at a minimum when no electromagnetic energy reflects off any structures around the vehicle. Alternatively, the energy threshold can be at a maximum when all transmitted energy is reflected and returned to the radar module 416, for example, when an object is directly blocking hardware executed by the radar module 416.

The position verification module 418 can calculate a travel distance from the calibration location to a maintenance location based on the maintenance information. In another example, the position verification module 418 can verify a calibration location of a machine based on the maintenance information and the location information.

In one exemplary embodiment, the main control system 420 can include a hand controller module 422, stop module 424, electric interlock module 426, display module 428, movement module 430, engine control module 432, and machine identification module 434. The hand controller module 422, stop module 424, electric interlock module 426, display module 428, movement module 430, engine control module 432, and machine identification module 434 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The main control system 420 can be configured to send and receive messages related to an inspection or other suitable activity, to and from the client or server. In another exemplary embodiment, the main control system 420 can generate one or more elements for display on the user device. The elements can provide additional information to the user related to an inspection. For example, alerts can be generated by the main control system 420 and displayed on the client to indicate inspection count, inspection completion, inspection submission, inspection request, or other suitable information. Additionally, system symbols can be displayed on the client to indicate inspection status.

The hand controller module 422 can operate workheads of the first vehicle. For example, the hand controller module 422 can execute any of the modules in the workhead system 436. In an example, the hand controller module 422 can activate the spike puller module 438 to perform maintenance on the railway. For example, the hand controller module 422 can control the workhead modules manually or automatically. For example, the hand controller module 422 can be used by an operator to control one of the workhead modules to perform the maintenance on the railway. Alternatively, the hand controller module 422 can automatically control the workhead modules to operate.

The stop module 424 can cause the first vehicle to cease operation. For example, the stop module 424 can be an emergency switch to cut power from the first vehicle in an emergency. Alternatively, the stop module 424 can be manually executed or automatically executed. In an example, the stop module 424 can manually be executed by an operator in the first vehicle. Alternatively, the stop module 424 can automatically cease the power to the first vehicle when an emergency situation triggers the automatic response.

The electric interlock module 426 can connect power to various components of the first vehicle. For example, the components can include controllers, manifolds, sensors, and brakes of the first vehicle. In another example, the electric interlock module 426 can include protections from spurious power to the components and control the power to each of the components the electric interlock module 426 is connected.

The display module 428 can display information regarding the operations for maintenance. For example, the display can include a mobile phone, laptop, tablet, virtual reality system, augmented reality system, heads up display, or another type of display. In an example, the display module 428 can show icons that correspond to the various operations and maintenance the first vehicle can perform. For example, the display module 428 can illuminate the display as part of a windshield of the first vehicle in an augmented reality manner.

The movement module 430 can position a first vehicle having a GPS receiver identifying the first vehicle location at the calibration location by correlating the first vehicle location with the calibration location. In another example, the movement module 430 can travel the travel distance from the calibration location to the maintenance location to perform the maintenance operation for a maintenance item at the maintenance location. In another example, the movement module 430 can travel to the calibration location to calibrate the machine.

The movement module 430 can rely upon a movement threshold to follow safety protocols. For example, the movement threshold can allow slack in an accelerator to avoid unwanted movement of the vehicle. The movement threshold can be dependent on the type of machine. For example, when the machine is a member of the tie gang, the movement threshold can be at a minimum to allow for slight movements of the machine for alignment purposes to perform maintenance. Alternatively, when the machine is a freight locomotive, the movement threshold can be a maximum to incentivize purposeful movement to cause the freight locomotive to begin to travel.

The engine control module 432 can control movement of the first vehicle. For example, the engine control module 432 can cause the first vehicle to accelerate, decelerate, or stop completely. In another example, the engine control module 432 can be controlled manually or automatically. For example, an operator can control the engine control module 432 to move the first vehicle. Alternatively, the engine control module 432 can be controlled automatically based on various sensor inputs.

The machine identification module 434 can display engine control and diagnostic information. For example, the machine identification module 434 can show the mechanical characteristics of the engine for maintenance of the first vehicle. The machine identification module 434 can identify diagnostic information regarding the first vehicle.

In one exemplary embodiment, the workhead system 436 can include a spike puller module 438, anchor spreader module 440, and tie kicker module 442. The spike puller module 438, anchor spreader module 440, and tie kicker module 442 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The workhead system 436 can be configured to send and receive messages related to an inspection or other suitable activity, to and from the client or server. In another exemplary embodiment, the workhead system 436 can generate one or more elements for display on the user device. The elements can provide additional information to the user related to an inspection. For example, alerts can be generated by the workhead system 436 and displayed on the client to indicate inspection count, inspection completion, inspection submission, inspection request, or other suitable information. Additionally, system symbols can be displayed on the client to indicate inspection status.

The spike puller module 438 can perform a maintenance operation based on an analysis indicating a spike pulling operation is required. For example, the spike puller module 438 can control a spike puller. The spike puller is a railroad maintenance machine designed to remove rail spikes from ties. In another example, the spike puller module 438 can automatically perform the maintenance operation, without operator intervention. In another example, the maintenance item is to receive maintenance when the analysis meets a condition. For example, the condition can include a maintenance score of above or below a maintenance threshold. In an example, the maintenance item is to receive maintenance based on a maintenance indicator, where the maintenance indicator is based on whether the maintenance item already received maintenance. The maintenance item can indicate whether it already received maintenance based on a quality status of the maintenance item. For example, a maintenance item already receiving maintenance can correspond to a high-quality status indicating the maintenance item already received maintenance. When the maintenance item requires maintenance, the maintenance item can have a low-quality status. In another example, the maintenance item is to receive maintenance based on a comparison between the maintenance information and information from the image including railway plate hole characteristics, railway spike patterns, and a distance corresponding to the plate hole characteristics. For example, the maintenance information can include tie marking information and tie grading information. The tie marking information can correspond to indicating whether a particular railroad tie requires maintenance. In an example, the tie grading information can correspond to a grade of the maintenance item, where the grade is a spectrum indicating a relative quality of the maintenance item. In another example, the maintenance item includes a railway tie.

The anchor spreader module 440 can perform a maintenance operation based on an analysis indicating an anchor spreading operation is required. For example, the anchor spreader module 440 can control an anchor spreader. The anchor spreader is a type of maintenance equipment designed to spread or shape ballast profiles. In another example, the anchor spreader module 440 can automatically perform the maintenance operation, without operator intervention. In another example, the maintenance item is to receive maintenance when the analysis meets a condition. For example, the condition can include a maintenance score of above or below a maintenance threshold. In an example, the maintenance item is to receive maintenance based on a maintenance indicator, where the maintenance indicator is based on whether the maintenance item already received maintenance. The maintenance item can indicate whether it already received maintenance based on a quality status of the maintenance item. For example, a maintenance item already receiving maintenance can correspond to a high-quality status indicating the maintenance item already received maintenance. When the maintenance item requires maintenance, the maintenance item can have a low-quality status. In another example, the maintenance item is to receive maintenance based on a comparison between the maintenance information and information from the image including railway plate hole characteristics, railway spike patterns, and a distance corresponding to the plate hole characteristics. For example, the maintenance information can include tie marking information and tie grading information. The tie marking information can correspond to indicating whether a particular railroad tie requires maintenance. In an example, the tie grading information can correspond to a grade of the maintenance item, where the grade is a spectrum indicating a relative quality of the maintenance item. In another example, the maintenance item includes a railway tie.

The tie kicker module 442 can perform a maintenance operation based on an analysis indicating a tie kicking operation is required. For example, the tie kicker module 442 can control a tie kicker. The tie kicker is a mechanical system for removing and installing track and switch ties having a clamp for gripping the ties for removal and insertion. In another example, the tie kicker module 442 can automatically perform the maintenance operation, without operator intervention. In another example, the maintenance item is to receive maintenance when the analysis meets a condition. For example, the condition can include a maintenance score of above or below a maintenance threshold. In an example, the maintenance item is to receive maintenance based on a maintenance indicator, where the maintenance indicator is based on whether the maintenance item already received maintenance. The maintenance item can indicate whether it already received maintenance based on a quality status of the maintenance item. For example, a maintenance item already receiving maintenance can correspond to a high-quality status indicating the maintenance item already received maintenance. When the maintenance item requires maintenance, the maintenance item can have a low-quality status. In another example, the maintenance item is to receive maintenance based on a comparison between the maintenance information and information from the image including railway plate hole characteristics, railway spike patterns, and a distance corresponding to the plate hole characteristics. For example, the maintenance information can include tie marking information and tie grading information. The tie marking information can correspond to indicating whether a particular railroad tie requires maintenance. In an example, the tie grading information can correspond to a grade of the maintenance item, where the grade is a spectrum indicating a relative quality of the maintenance item. In another example, the maintenance item includes a railway tie.

In one exemplary embodiment, the image capture and analysis system 444 can include an image capture module 446, image analysis module 448, and visual position module 450. The image capture module 446, image analysis module 448, and visual position module 450 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The image capture and analysis system 444 can be configured to send and receive messages related to an inspection or other suitable activity, to and from the client or server. In another exemplary embodiment, the image capture and analysis system 444 can generate one or more elements for display on the user device. The elements can provide additional information to the user related to an inspection. For example, alerts can be generated by the image capture and analysis system 444 and displayed on the client to indicate inspection count, inspection completion, inspection submission, inspection request, or other suitable information. Additionally, system symbols can be displayed on the client to indicate inspection status.

The image capture module 446 can capture an image of the maintenance item. For example, the image capture module 446 can control a camera of the first vehicle. The image can include an environment of the first vehicle. Alternatively, the image can include the maintenance item.

The image analysis module 448 can generate an analysis of the maintenance item based on the image. For example, the analysis is based on image analysis techniques. In an example, wherein the image analysis techniques can include a machine learning model. In another example, the image analysis module 448 can transmit the image to a central server to generate the analysis. For example, the central server includes a server on a machine in a tie gang. In another example, the central server includes a server in a cloud-based environment.

The visual position module 450 can identify the location of the first vehicle based on the image of the environment. The visual position module 450 can correlate the image of the environment with the location information to match the image of the environment to the location of the first vehicle.

Figure 5A:
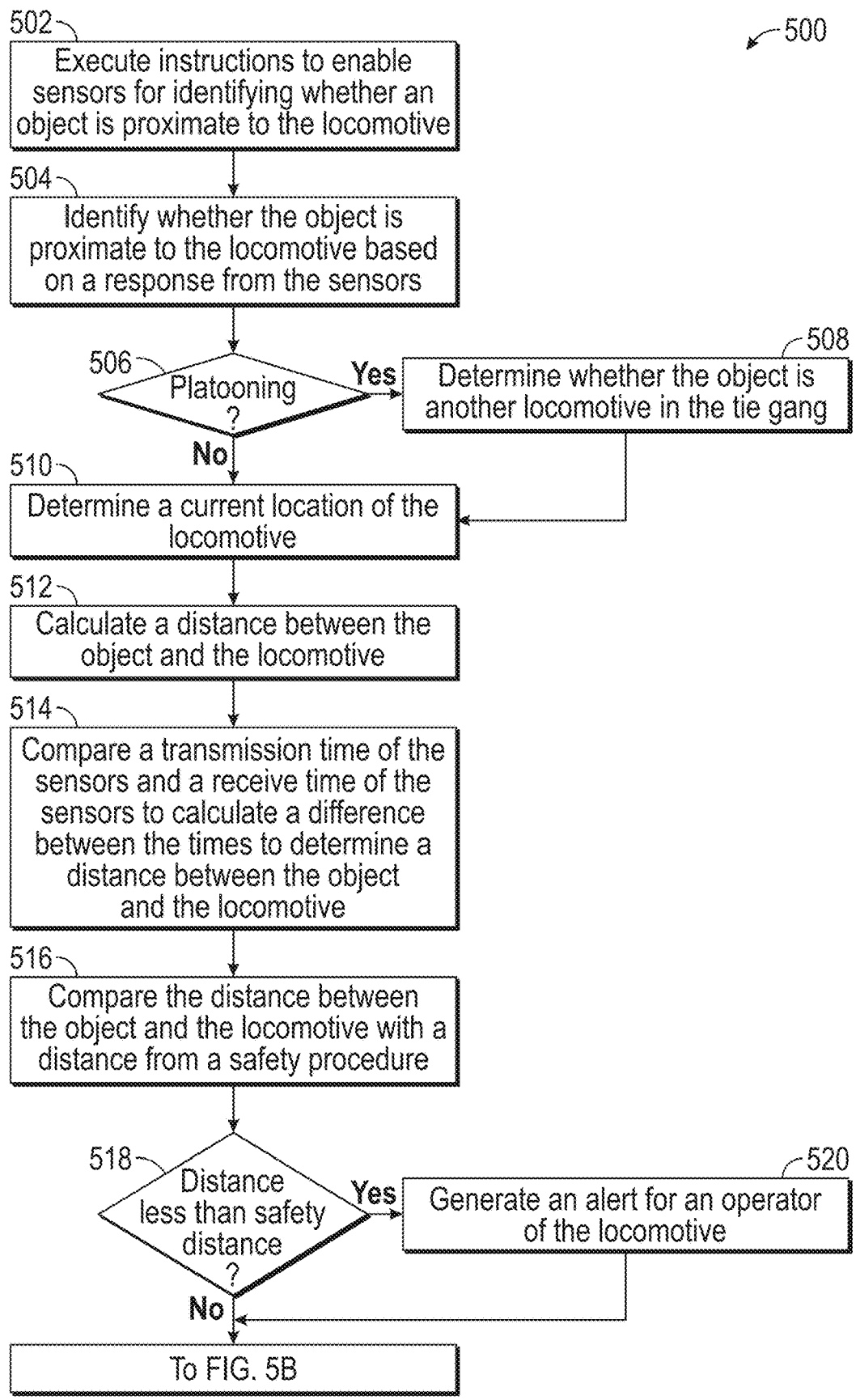
FIGS. 5A and 5B illustrate a flowchart exemplifying collision avoidance control logic, in accordance with one or more exemplary embodiments of the present disclosure.
Figure 5B:
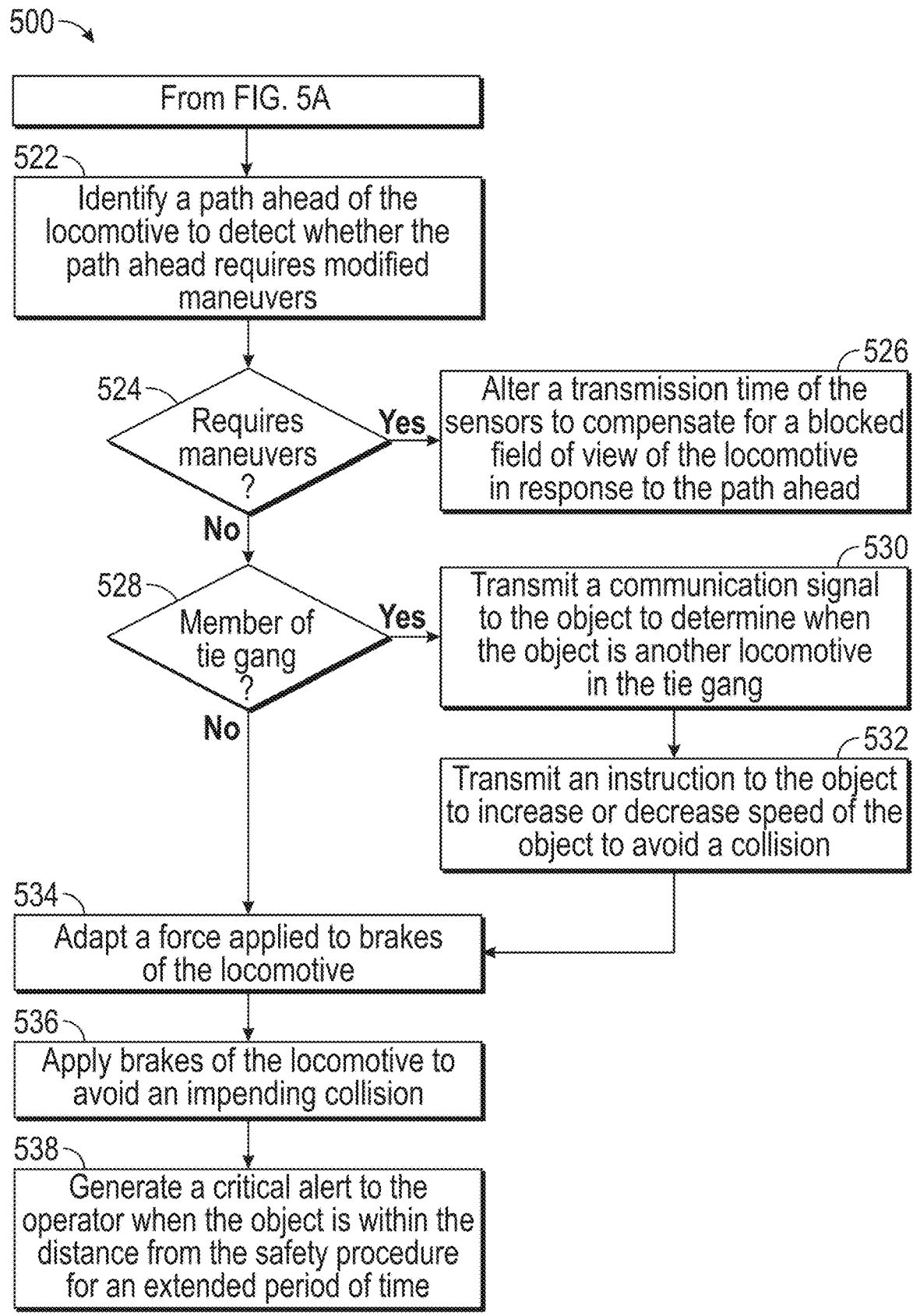

FIGS. 5A and 5B illustrate a flowchart exemplifying collision avoidance control logic 500, in accordance with one or more exemplary embodiments of the present disclosure. The collision avoidance control logic 500 can be implemented as an algorithm on a server 102, a machine learning module, a machine 150, a database, or other suitable system. Additionally, the collision avoidance control logic 500 can implement or incorporate one or more features of the railroad maintenance system 400, including the file management system 402, positioning system 410, main control system 420, workhead system 436, and image capture and analysis system 444. The collision avoidance control logic 500 can be achieved with software, hardware, firmware, an API, a network connection, a network transfer protocol, HTML, DHTML, JavaScript, Dojo, Ruby, Rails, other suitable applications, or a suitable combinations thereof.

The collision avoidance control logic 500 can leverage the ability of a computer platform to spawn multiple processes and threads by processing data simultaneously. In one embodiment, the collision avoidance control logic 500 can implement a memory for storing the acquired sensor inputs and location data relating to the acquired sensor inputs, and a recognition model representing contour information of a surrounding environment of a locomotive of the tie gang. In another embodiment, the collision avoidance control logic 500 can instantiate instructions for a processor that is configured to identify the contour information of the surrounding environment and detect whether an object is proximate to the locomotive. The speed and efficiency of the collision avoidance control logic 500 can be greatly improved by instantiating more than one process to implement a tangent-flow rail inspection. However, one skilled in the art of programming will appreciate that use of a single processing thread may also be utilized and is within the scope of the present disclosure. The collision avoidance control logic 500 of the present embodiment begins at step 502.

At step 502, in one embodiment, the control logic 500 can execute instruction to enable sensors for identifying whether an object is proximate to the locomotive. For example, the sensors can include a real-time sensor array for detecting objects using a plurality of acquired sensor inputs. The acquired sensor inputs can include real-time images. The images can be used to identify the quality of a railway asset for maintenance purposes. Alternatively, the images can be used to identify the environment impacting how the locomotive will travel. For example, real-time can be sub-second (e.g., millisecond) detection of objects by transmission and reception of one or more signals. In another example, the instructions can execute in a firmware environment to instantiate a firmware image of the real-time sensor array. The control logic 500 then proceeds to step 504.

At step 504, in one embodiment, the control logic 500 can identify whether the object is proximate to the locomotive. For example, the real-time sensor array can transmit a signal at a particular frequency and receive a response signal at a comparable frequency. The particular frequency can vary depending on settings of the real-time sensor array. For example, the real-time sensor array can include settings for detecting whether the object is proximate. The settings can result in the particular frequency being less than a threshold frequency needed to detect a locomotive on a track in front of the locomotive. In another example, the real-time sensor array can include settings based on environmental conditions such as when rain is detected in the surrounding environment. When the environmental conditions are detected, the real-time sensor array can automatically select appropriate settings with respect to the environmental conditions. The control logic 500 then proceeds to step 506.

At step 506, in one embodiment, the control logic 500 can determine whether the tie gang is platooning. For example, the control logic 500 can determine whether the tie gang is platooning by transmitting a communication signal to the surrounding area and awaiting a response from another member of the tie gang. In another example, the tie gang can platoon when locomotives of the tie gang drive together in a way that could decrease distances between the locomotives. The tie gang can platoon by a number of various means, for example, the locomotives can be electrically coupled through wireless communication, or physically coupled by mechanical coupling. The tie gang can platoon with an aggregation of a plurality of locomotives to perform maintenance on the railway. In an example, the tie gang can include an aggregation of at least two locomotives of the tie gang. In another example, not all members of the tie gang can platoon, but a subset of the members of the tie gang. If the locomotive is platooning, the control logic 500 proceeds to step 508. If the locomotive is not platooning, the control logic 500 then proceeds to step 510.

At step 508, in one embodiment, the control logic 500 can determine whether the object is another locomotive in the tie gang. For example, the control logic 500 can transmit a communication signal to the surrounding area and await a response from another member of the tie gang. In an example, if the object is a member of the tie gang, the control logic 500 can receive a response signal from the object indicating the object is a member of the tie gang. The control logic 500 then proceeds to step 510.

At step 510, in one embodiment, the control logic 500 can determine a current location of the locomotive. The control logic 500 then proceeds to step 512.

At step 512, in one embodiment, the control logic 500 can calculate a distance between the object and the locomotive. For example, the control logic 500 can calculate the distance based on the response received by the real-time sensor array. The control logic 500 can calculate the distance by comparing a transmission time of the signal from the real-time sensor array with a response time of the response signal to the transmission time. The difference in time between the transmission time and the response time can be used to determine the distance based on a relation of the signal properties to time of flight. The control logic 500 then proceeds to step 514.

At step 514, in one embodiment, the control logic 500 can compare a transmission time of the sensors and a receive time of the sensor to calculate a difference between the times to determine a distance between the object and the locomotive. The control logic 500 then proceeds to step 516.

At step 516, in one embodiment, the control logic 500 can compare the distance between the object and the locomotive with a distance from a safety procedure. The control logic 500 then proceeds to step 518.

At step 518, in one embodiment, the control logic 500 can determine whether the distance is less than a safety distance. For example, the control logic 500 can compare the distance between the locomotive and the object with the safety distance to determine which value is larger. In another example, the safety distance can be predetermined by an operator of the locomotive, a regulating agency, an organization policy, or any other source of safety procedures. In an example, the safety distance can be 300 feet. If the distance is less than the safety distance, the control logic 500 then proceeds to step 520. If the distance is not less than the safety distance, the control logic 500 then proceeds to step 522.

At step 520, in one embodiment, the control logic 500 can generate an alert for an operator of the locomotive. For example, the alert to the operator can include a visual, audible, haptic, or other form of ability to relay an alert. In another example, the alert can be displayed on a HUD (as described in FIG. 12). The control logic 500 then proceeds to step 522.

At step 522, in one embodiment, the control logic 500 can identify a path ahead of the locomotive to detect whether the path ahead requires modified maneuvers. For example, the control logic 500 can transmit a plurality of signals at various frequencies to generate a comprehensive environmental perspective. In an example, the comprehensive environmental perspective can include independent images generated from the real-time sensor array. In another example, the control logic 500 can generate an image using a real-time camera, an image using a plurality of radar signal inputs, an image based on location information retrieved from local or external memory. In another example, the control logic 500 can combine the various images from the real-time sensor array into the comprehensive environmental perspective. The control logic 500 can identify the path ahead based on the comprehensive environmental perspective to classify whether the path ahead requires a modified maneuver. For example, the path ahead can require the modified maneuver when the path ahead includes a curve, a blocked field of view, a gradient incline, gradient decline, or another such change in trajectory of the track. The control logic 500 then proceeds to step 524.

At step 524, in one embodiment, the control logic 500 can determine whether the path ahead of the locomotive requires maneuvers. For example, the control logic 500 can compare the comprehensive environmental perspective to known paths which required maneuvers. In an example, the control logic 500 can process raw digital signals corresponding to the comprehensive environmental perspective in an algorithm to determine whether the digital signals match a classification of a path ahead requiring modified maneuvers. For example, the control logic 500 can instantiate a machine learning algorithm to classify the raw digital signals corresponding to the comprehensive environmental perspective to classify whether the path ahead requires the modified maneuvers. If the path ahead requires maneuvers, the control logic 500 then proceeds to step 524. If the path ahead does not require maneuvers, the control logic 500 then proceeds to step 526.

At step 526, in one embodiment, the control logic 500 can alter a transmission time of the sensors to compensate for a blocked field of view of the locomotive in response to the path ahead. For example, the control logic 500 can increase the transmission time of the signal transmitted from the real-time sensor array to constantly transmit the signal to receive a response with increased detail of the environment. In an example, as the transmission time increases, the control logic 500 can receive greater detail of the environment. In another example, the control logic 500 can decrease a wavelength of the signal from the real-time sensor array. Generally, as the wavelength decreases, the control logic 500 can receive greater detail of the environment. The control logic 500 then proceeds to step 528.

At step 528, in one embodiment, the control logic 500 can determine whether the object is another locomotive of the tie gang. If the object is another member of the tie gang, the control logic 500 then proceeds to step 530. If the object is not a member of the tie gang, the control logic 500 then proceeds to step 534.

At step 530, in one embodiment, the control logic 500 can transmit a communication signal to the object to determine when the object is another machine in the tie gang. For example, the control logic 500 can transmit the communication signal requesting a response to identify whether the object is another machine in the tie gang. In an example, the communication signal can include custom protocol structures for machine-to-machine (M2M) communication. In another example, the communication signal follows standard protocol structures. The control logic 500 then proceeds to step 532.

At step 532, in one embodiment, the control logic 500 can transmit an instruction to the object to increase or decrease speed of the object to avoid a collision. For example, when the object is a member of the tie gang, the control logic 500 can transmit the communication signal including an instruction to increase speed of the object. By instructing the object to increase its speed, the control logic 500 can avoid an impending collision. Alternatively, when the object is a member of the tie gang, the control logic 500 can instruct the object to decrease speed. By instructing the object to decrease its speed, the control logic 500 can maintain the distance between the locomotive and the object. The control logic 500 then proceeds to step 534.

At step 534, in one embodiment, the control logic 500 can adapt a force applied to brakes of the locomotive. For example, the force of the brakes can correspond to an environmental condition surrounding the locomotive. In an example, the control logic 500 can determine whether water is on the tracks and correspondingly can adapt the force applied to the brakes according to a safety procedure. The safety procedure can include a cautious approach to applying the brakes to avoid the locomotive from sliding on the tracks. In another example, the control logic 500 can adapt the force applied to the brakes according to a change in the weight of the locomotive. For example, the weight of the locomotive can vary depending on an amount of railway assets in cargo. In an example, when the locomotive is a member of the tie gang to lay down railroad ties, the weight of the locomotive will decrease over time when the locomotive progresses through a maintenance work queue. Alternatively, when the locomotive is a member of the tie gang to pick up railroad ties, the weight of the locomotive will increase over time when the locomotive progresses through a maintenance work queue. In either event, the control logic 500 can adapt the force applied to the brakes depending on the change in weight of the locomotive. The control logic 500 then proceeds to step 536.

At step 536, in one embodiment, the control logic 500 can apply brakes of the locomotive to avoid an impending collision. For example, the control logic 500 can apply the brakes to the locomotive when the object is within the distance from the safety procedure for an extended period of time. The control logic 500 then proceeds to step 538.

At step 538, in one embodiment, the control logic 500 can generate a critical alert to the operator. For example, the control logic 500 can generate the alert when the object is within the distance from the safety procedure for an extended period of time. In an example, the alert to the operator can include a visual, audible, haptic, or other form of ability to relay an alert. In another example, the alert can be displayed on a HUD (as described in FIG. 12). The critical nature of the alert can result in the control logic 500 automatically applying full force to the brakes of the locomotive in a last effort to stop the locomotive from colliding with the object. The control logic 500 then terminates or awaits a new inspection creation request and can repeat the aforementioned steps.

Figure 6:
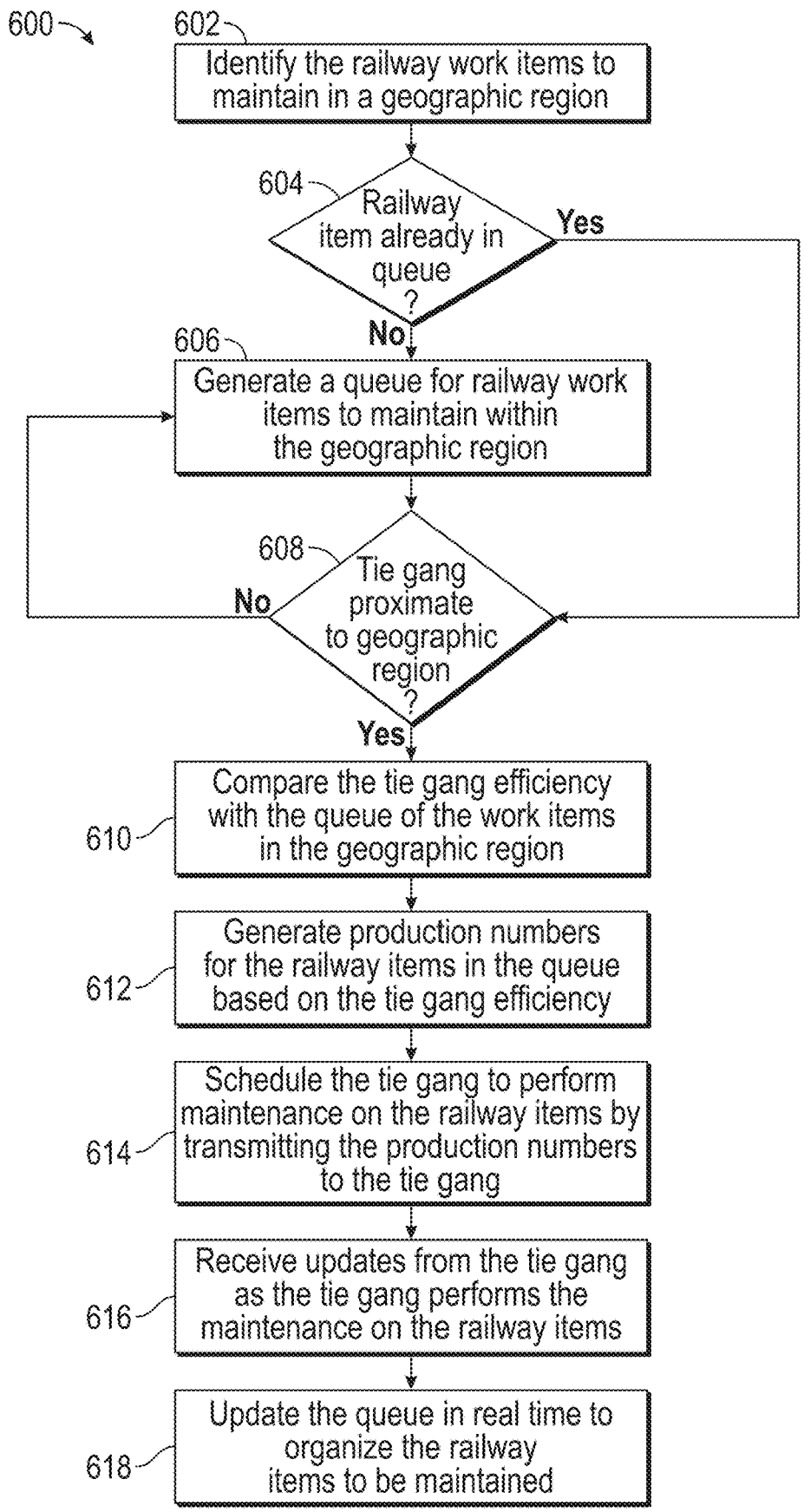
FIG. 6 illustrates a flowchart exemplifying machine production number generation control logic, in accordance with one or more exemplary embodiments of the present disclosure.

FIG. 6 illustrates a flowchart exemplifying machine production number generation control logic 600, in accordance with one or more exemplary embodiments of the present disclosure. The machine production number generation control logic 600 can be implemented as an algorithm on a server 102, a machine learning module, a machine 150, a database, or other suitable system. Additionally, the machine production number generation control logic 600 can implement or incorporate one or more features of the railroad maintenance system 200, including the network management system 202, asset management system 204, and production management system 206. The machine production number generation control logic 600 can be achieved with software, hardware, firmware, an API, a network connection, a network transfer protocol, HTML, DHTML, JavaScript, Dojo, Ruby, Rails, other suitable applications, or a suitable combinations thereof.

The machine production number generation control logic 600 can leverage the ability of a computer platform to spawn multiple processes and threads by processing data simultaneously. In one embodiment, the machine production number generation control logic 600 can implement a memory for storing a queue of railway assets to receive maintenance based on maintenance information for the railway assets and a geographic region. In another embodiment, the machine production number generation control logic 600 can instantiate instruction on a processor configured to generate work production numbers for the queue of railway assets and manage a production output for a tie gang proximate to the geographic region. In another embodiment, the machine production number generation control logic 600 can instantiate a cloud environment for organizing workflow production and updating the queue of railway assets in real-time items to receive maintenance. The speed and efficiency of the machine production number generation control logic 600 can be greatly improved by instantiating more than one process to implement a tangent-flow rail inspection. However, one skilled in the art of programming will appreciate that use of a single processing thread may also be utilized and is within the scope of the present disclosure. The machine production number generation control logic 600 of the present embodiment begins at step 602.

At step 602, in one embodiment, the control logic 600 can identify the railway assets to maintain in a geographic region. For example, the control logic 600 can identify the railway assets to maintain based on an inventory. In an example, the control logic 600 can access the inventory of an organization to determine which of the railway assets require maintenance. For example, the control logic 600 can filter the inventory based on the geographic region to focus search results for the railway assets. In another example, the control logic 600 can download the inventory in the form of a MICROSOFT EXCEL® spreadsheet, in a comma separated value (CSV) file, or another form of document to generate a queue of the railway assets requiring maintenance. The control logic 600 then proceeds to step 604.

At step 604, in one embodiment, the control logic 600 can determine whether the railway asset is already in the queue. The control logic 600 can compare the railway asset with the items in the queue to determine whether the railway asset already exists. In an example, the control logic 600 can perform various algorithmic search functions to determine whether the railway asset exists in the queue. For example, the control logic 600 can identify parameters of the railway asset to perform a binary search, linear search, tree search, or another type of search algorithm. If the railway asset is already in the queue, the control logic 600 then proceeds to step 608. If the railway asset is not in the queue, the control logic 600 then proceeds to step 606.

At step 606, in one embodiment, the control logic 600 can generate a queue for railway assets to maintain within the geographic region. For example, the control logic 600 can generate the queue based on information from the inventory. In an example, the control logic 600 can generate the queue from the document obtained from the inventory. In another example, the queue can be in the form of a MICROSOFT EXCEL® spreadsheet, in a comma separated value (CSV) file, or another form of document to generate a queue of the railway assets requiring maintenance. The control logic 600 then proceeds to step 608.

At step 608, in one embodiment, the control logic 600 can identify whether the tie gang is proximate to the geographic region. For example, the control logic 600 can identify whether the tie gang is proximate to the geographic region based on a tie gang work schedule or a location determination of the tie gang. In an example, the control logic 600 can reference the work schedule of the tie gang and determine whether the tie gang is located proximate to the geographic region at a particular timeframe for performing maintenance. Alternatively, the control logic 600 can identify a location of the tie gang based on received signal parameters. For example, the control logic 600 can receive the signal from the tie gang indicating various information regarding the tie gang. In an example, the signal can include location information in the form of latitude and longitude data, GPS data, or another form of information to identify the location of the tie gang. In another example, the control logic 600 can generate a list of tie gangs proximate to a section of track to perform maintenance. In an example, the control logic 600 can compare the tie gang with the list of tie gangs to determine whether the tie gang is proximate to the geographic region. In another example, the control logic 600 can access a tie gang schedule from an organization to identify the tie gangs proximate to the geographic region over a particular timeframe. For example, the geographic region can correspond to the section of track to perform maintenance. If the tie gang is proximate the geographic region, the control logic 600 then proceeds to step 610. If the tie gang is not proximate to the geographic region, the control logic 600 then proceeds to step 606.

At step 610, in one embodiment, the control logic 600 can compare the tie gang efficiency with the queue of the work items in the geographic region to estimate a completion time for performing maintenance on the railway assets. For example, the control logic 600 can identify the efficiency of the tie gang in terms of railway assets per minute. In an example, the control logic 600 can compare the number of railway assets with the efficiency of the tie gang to determine whether the tie gang can complete the railway assets in the queue. The control logic 600 then proceeds to step 612.

At step 612, in one embodiment, the control logic 600 can generate production numbers for the railway assets in the queue. For example, the control logic 600 can generate the production numbers with respect to the inventory of railway assets. In an example, the control logic 600 can generate the production numbers in the queue based on the efficiency of the tie gang. For example, if the tie gang has an efficiency of maintaining or replacing 13 ties per minute, the control logic 600 can schedule an appropriate amount of railway assets depending on the tie gang efficiency. In an example, the control logic 600 can generate unique production numbers for each of the railway assets requiring maintenance. The unique production numbers can be randomly generated, pseudo-randomly generated, or sequentially generated, or another form of production number generation. In another example, the control logic 600 can update the inventory with the unique production numbers associated with each of the railway assets. In another example, the production numbers for the railway assets can correlate with the geographic location in the form of a geographic identifier as part of the production numbers. The control logic 600 can avoid productivity inconsistencies between the members of the tie gang by assigning a set amount of railway assets to perform maintenance, rather than perform maintenance based on the time-studies of the tie gang. The control logic 600 then proceeds to step 614.

At step 614, in one embodiment, the control logic 600 can schedule the tie gang to perform maintenance on the railway assets by transmitting the production numbers to the tie gang. For example, the control logic 600 can transmit the production numbers to a lead member of the tie gang to organize a process of performing maintenance on the railway assets. The control logic 600 can schedule the tie gang based on a number of the railway assets and the efficiency of the tie gang. In this way, the control logic 600 can optimize the time of the tie gang for performing maintenance. The control logic 600 then proceeds to step 616.

At step 616, in one embodiment, the control logic 600 can receive updates from the tie gang as the tie gang performs the maintenance on the railway assets. For example, the updates can include the railway assets where performance was completed by the tie gang. The control logic 600 can update the inventory indicating the railway assets where maintenance was completed. The control logic 600 then proceeds to step 618.

At step 618, in one embodiment, the control logic 600 can update the queue in real-time to organize the railway assets to be maintained. For example, the control logic 600 can minimize a number of railway assets in the queue based on which railway assets the tie gang completes. In an example, the control logic 600 can access the queue the tie gang is referencing to modify the remaining railway assets in response to the progress of the tie gang. The control logic 600 then terminates or awaits a new inspection creation request and can repeat the aforementioned steps.

Figure 7:
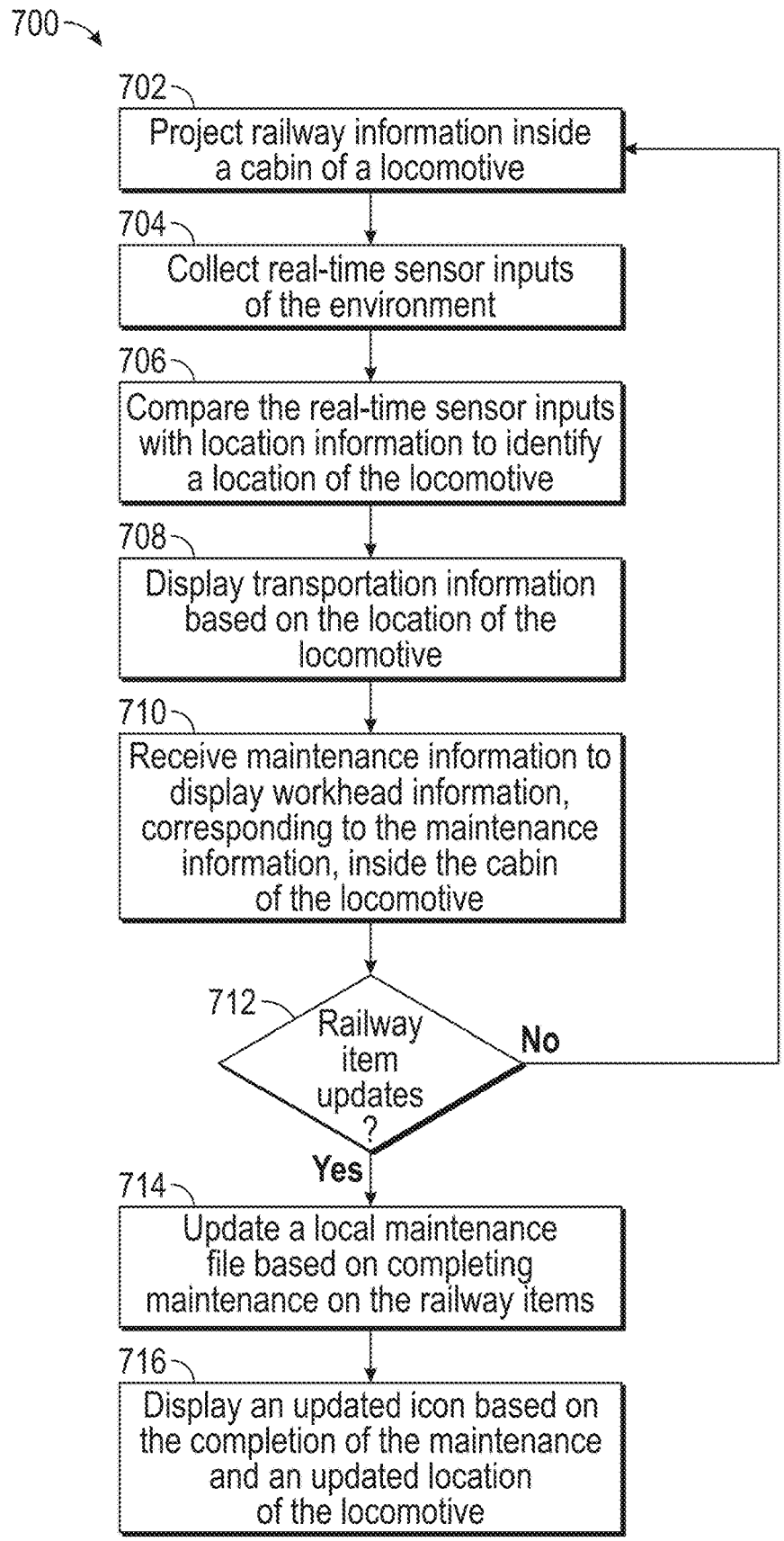
FIG. 7 illustrates a flowchart exemplifying HUD control logic, in accordance with one or more exemplary embodiments of the present disclosure.

FIG. 7 illustrates a flowchart exemplifying HUD control logic 700, in accordance with one or more exemplary embodiments of the present disclosure. The HUD control logic 700 can be implemented as an algorithm on a server 102, a machine learning module, a machine 150, a database, or other suitable system. Additionally, the HUD control logic 700 can implement or incorporate one or more features of the railroad maintenance system 400, including the file management system 402, positioning system 410, main control system 420, workhead system 436, and image capture and analysis system 444. The HUD control logic 700 can be achieved with software, hardware, firmware, an API, a network connection, a network transfer protocol, HTML, DHTML, JavaScript, Dojo, Ruby, Rails, other suitable applications, or a suitable combinations thereof.

The HUD control logic 700 can leverage the ability of a computer platform to spawn multiple processes and threads by processing data simultaneously. In one embodiment, the HUD control logic 700 can implement a real-time sensor array for identifying a location using a plurality of acquired sensor inputs, including real-time images. In another embodiment, the HUD control logic can implement a memory for storing the acquired sensor inputs and location data relating to the acquired sensor inputs, and a recognition model representing contour information of a surrounding environment of a locomotive. In another embodiment, the HUD control logic 700 can instantiate a processor that is configured to identify the surrounding environment and update a display of the locomotive according to the location of the locomotive. The speed and efficiency of the HUD control logic 700 can be greatly improved by instantiating more than one process to implement a tangent-flow rail inspection. However, one skilled in the art of programming will appreciate that use of a single processing thread may also be utilized and is within the scope of the present disclosure. The HUD control logic 700 of the present embodiment begins at step 702.

At step 702, in one embodiment, the control logic 700 can project railway information onto a display. For example, the display can include an inside of a cabin of a locomotive. Alternatively, the display can include another device for displaying information in an augmented reality (AR) setting. In an example, the display can include AR lenses for an operator performing maintenance on a railway asset. For example, the railway information can include maintenance indicators, transportation notices, and direction symbols, among other relevant information for an operator of the locomotive. The control logic 700 can control hardware within the cabin to display the information in an AR manner. For example, the control logic 700 can present data to the operatory, without the operator looking away from their points of view. In an example, the control logic 700 can enable the operator to continue focusing on performing maintenance while the control logic 700 can display the information to the operator. In an example, the control logic 700 can project the information The control logic 700 then proceeds to step 704.

At step 704, in one embodiment, the control logic 700 can collect real-time sensor inputs of the environment. For example, the control logic 700 can store the real-time sensor inputs as raw data to a local memory. In an example, the local memory can include a specific hardware component to store the real-time sensor inputs. In another example, the sensor inputs can include inputs from a high-resolution radar. For example, the local memory can include solid-state drive (SSD), non-volatile memory (NVM), NVM-express (NVMe), or another compatible local memory component. The control logic 700 then proceeds to step 706.

At step 706, in one embodiment, the control logic 700 can compare the real-time sensor inputs with location information to identify a location of the locomotive. For example, the control logic 700 can use the real-time sensor inputs can generate a comprehensive environmental perspective. The control logic 700 can compare the comprehensive environmental perspective with location information to determine the location of the locomotive. In an example, the location information can include real-time images, latitude and longitude coordinates, GPS data, or another form of information indicating location of the locomotive. The control logic 700 then proceeds to step 708.

At step 708, in one embodiment, the control logic 700 can display transportation information. For example, the control logic 700 can display the transportation information from a maintenance file based on the location of the locomotive. In an example, the transportation information can include maintenance indicators, transportation notices, and direction symbols, among other relevant information for an operator of the locomotive. The maintenance file can include the railway assets on which to perform maintenance and a corresponding location of the railway asset. In an example, the maintenance file can include a local file stored in memory of the locomotive accessible by the control logic 700. In another example, the maintenance file can include a cloud-based file accessible by the control logic 700. The railway assets can include a tie, ballast, spike, rail, or another component to the railway system. The control logic 700 then proceeds to step 710.

At step 710, in one embodiment, the control logic 700 can receive maintenance information to display workhead information, corresponding to the maintenance information, inside the cabin of the locomotive. For example, the workhead information can include spike puller information, tie kicker information, and anchor spreader information, or relevant information relating to another workhead type. In an example, the maintenance information can indicate whether the railway assets are to receive maintenance. For example, the maintenance information can cross reference the railway assets with a particular type of maintenance to perform. In an example, the control logic 700 can access the maintenance file to retrieve the maintenance information to perform spike pulling operations on the railway asset. The control logic 700 then proceeds to step 712.

At step 712, in one embodiment, the control logic 700 can determine whether any updates to the railway assets exist. For example, the control logic 700 can verify whether the information displayed is current, or if new information is available. The control logic 700 can compare a version of the information to determine whether the latest information is displayed. In another example, the control logic 700 can verify the displayed information based on access to a central information repository for updating a queue for railway assets to perform maintenance. If an update exists, the control logic 700 then proceeds to step 714. If no update exists, the control logic 700 then proceeds to step 702.

At step 714, in one embodiment, the control logic 700 can update the maintenance file based on completing maintenance on the railway assets. For example, the control logic 700 can update the local maintenance file in response to the operator completing maintenance on a current railway asset. In another example, the control logic 700 can determine when maintenance on the current railway asset is complete. For example, the control logic 700 can automatically determine the maintenance is complete or the operator can manually indicate the maintenance is complete. The control logic 700 then proceeds to step 716.

At step 716, in one embodiment, the control logic 700 can display an updated icon based on the completion of the maintenance and an updated location of the locomotive. For example, the control logic 700 can update the icons relating to the information displayed. To update the icons, the control logic 700 can access a location in memory corresponding to the maintenance information and modify a value associated with the icon. In an example, the updated icon can include a change in color, shape, content, text, position, or any other change indicating an updated icon. In an example, the updated icon can correspond to a type of maintenance to be performed. The control logic 700 then terminates or awaits a new inspection creation request and can repeat the aforementioned steps.

Figure 8:
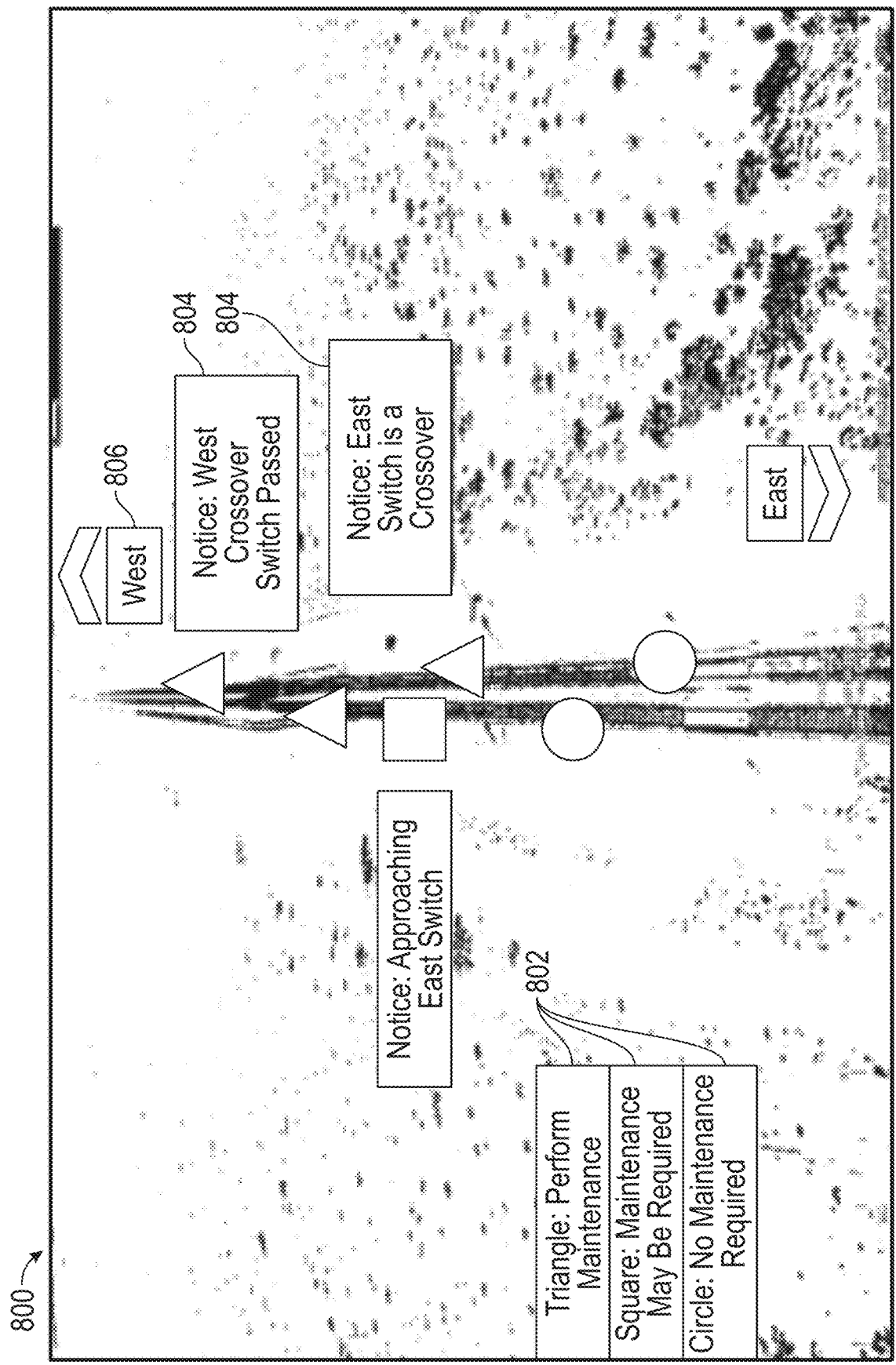
FIG. 8 illustrates a user interface (UI) of a HUD, in accordance with one or more exemplary embodiments of the present disclosure.

FIG. 8 illustrates a system interface of the HUD 800. In one embodiment, the HUD 800 can include maintenance indicators 802, transportation notices 804, and direction symbols 806. The maintenance indicators 802, in one embodiment, can include a variety of symbols. For example, the maintenance indicators 802 can include a triangle, square, and circle, among other relevant symbols. In an example, the triangle can represent where a railway asset is located to perform maintenance. In another example, the square can represent maintenance may be required depending on a queue of railway assets. In another example, the circle can represent no maintenance is required. The transportation notices 804, in one embodiment, can include a plurality of notices regarding the track ahead of the locomotive. For example, the notices can include when the locomotive is approaching a switch. In another example, the notices can include when the locomotive is approaching a crossover. In another example, the notices can include when the locomotive passed a switch. The direction symbols 806, in one embodiment, can include a direction of travel for the locomotive. For example, the direction symbols 806 can include an arrow indicating north, south, east, or west, or any intermediate direction or representation of direction of travel.

The present disclosure achieves at least the following advantages:

1. enables collision avoidance between members of a tie gang for enhanced safety;
2. enhances organizational inventory management of railway asset maintenance;
3. increases the efficiency of asset inspections and inspectors via improved systems that can add and modify prompts based on responses;
4. provides a unified platform for facilitating railroad asset inspections;
5. provides centralized and accessible data models and criteria for assets throughout the railroad infrastructure, enabling faster and more-informed decision making; and
6. provides increased efficiency from the machine generate production numbers to queue work items for the tie gang and a HUD to display pertinent information regarding the maintenance for the particular railway asset and travel information.

Persons skilled in the art will readily understand that the advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A system for collision avoidance between locomotives of a tie gang performing maintenance on a railway, comprising:
    a real-time sensor array for detecting objects using a plurality of acquired sensor inputs, including real-time images;
    a memory for storing the acquired sensor inputs and location data relating to the acquired sensor inputs, and a recognition model representing contour information of a surrounding environment of a locomotive of the tie gang; and
    a processor that is configured to identify the contour information of the surrounding environment and detect whether an object is proximate to the locomotive by performing the steps of:
        identifying whether the object is proximate to the locomotive based on a response received by the real-time sensor array;
        calculating a distance to the object based on the response received by the real-time sensor array;

when the distance between the object and the locomotive is less than a safety procedural threshold distance, generating an alert for an operator of the locomotive;

transmitting a communication signal to the object to determine whether the object is an additional locomotive of the tie gang;

applying brakes of the locomotive to avoid an impending collision, and altering a transmission time of the real-time sensor array to compensate for a curve or blocked field.

2. The system of claim 1, wherein the processor is further configured to perform the steps of determining whether the object is platooning in an aggregation of at least two locomotives of the tie gang electronically coupled to perform maintenance on the railway.

3. The system of claim 1, wherein the processor is further configured to perform the steps of comparing the distance between the object and the locomotive with the safety procedural threshold distance to calculate whether the object is within the safety procedural threshold distance.

4. The system of claim 1, wherein the processor is further configured to perform the steps of identifying a path ahead of the locomotive to detect whether the path ahead includes a curve or a blocked field of view.

5. The system of claim 1, wherein the processor is further configured to perform the steps of increasing the transmission time of the real-time sensor array.

6. The system of claim 1, wherein the processor, when the object is the additional locomotive of the tie gang, is further configured to perform the steps of instructing the object to increase or decrease a speed of the object.

7. The system of claim 1, wherein the processor is further configured to perform the steps of adapting a force applied to the brakes based on environmental conditions of the locomotive.

8. The system of claim 1, wherein the processor, when the object is not the additional locomotive of the tie gang, is further configured to perform the steps of generating a critical alert to the operator.

9. The system of claim 1, wherein the processor is further configured to perform the steps of adapting a force applied to the brakes based on a variable weight of the locomotive, wherein the variable weight includes increasing or decreasing total weight of the locomotive.

10. A method for collision avoidance between members of a tie gang to perform maintenance on a railway, comprising:
identifying whether the object is proximate to the machine based on a response received by the sensors;
calculating a distance to the object based on the response received by the sensors;
when the distance between the object and the machine is less than the distance from the safety procedure, generating an alert for the operator;
determining a path ahead of the machine to detect whether the path ahead requires modified maneuvers;
transmitting a communication signal to the object to determine whether the object is a member of the tie gang; and
applying the brakes to avoid a collision when the vehicle is detected or the path includes a curve, and
altering a transmission time of the real-time sensor array to compensate for the curve or a blocked field.

11. The method of claim 10, wherein the method further comprises determining whether the object is platooning in an aggregation of at least two locomotives of the tie gang electronically coupled to perform maintenance on the railway.

12. The method of claim 10, wherein the method further comprises comparing the distance between the object and the locomotive with the safety procedural threshold distance to calculate whether the object is within the safety procedural threshold distance.

13. The method of claim 10, wherein the method further comprises determining a path ahead of the locomotive to detect whether the path ahead includes a curve or a blocked field of view.

14. The method of claim 10, wherein the method further comprises increasing the transmission time of the real-time sensor array.

15. The method of claim 10, wherein the method, when the object is the additional locomotive of the tie gang, further comprises instructing the object to increase or decrease a speed of the object.

16. The method of claim 10, wherein the method further comprises adapting a force applied to the brakes based on environmental conditions of the locomotive.

17. The method of claim 10, wherein the method, when the object is not the additional locomotive of the tie gang, further comprises generating a critical alert to the operator.

18. The method of claim 10, wherein the method further comprises adapting a force applied to the brakes based on a variable weight of the locomotive, wherein the variable weight includes increasing or decreasing total weight of the locomotive.

* * * * *